(12) United States Patent
Nishizawa et al.

(10) Patent No.: US 12,276,949 B2
(45) Date of Patent: Apr. 15, 2025

(54) VALVE STATE GRASPING SYSTEM, DISPLAY DEVICE AND ROTARY VALVE, VALVE STATE GRASPING PROGRAM, RECORDING MEDIUM, AND VALVE STATE GRASPING METHOD

(71) Applicant: KITZ CORPORATION, Chiba (JP)

(72) Inventors: Isao Nishizawa, Chiba (JP); Yuu Inoue, Chiba (JP)

(73) Assignee: KITZ CORPORATION, Tokyo (JP)

( * ) Notice: Subject to any disclaimer, the term of this patent is extended or adjusted under 35 U.S.C. 154(b) by 270 days.

(21) Appl. No.: 17/780,781

(22) PCT Filed: Dec. 10, 2020

(86) PCT No.: PCT/JP2020/046049
§ 371 (c)(1),
(2) Date: May 27, 2022

(87) PCT Pub. No.: WO2021/117810
PCT Pub. Date: Jun. 17, 2021

(65) Prior Publication Data
US 2022/0413454 A1    Dec. 29, 2022

(30) Foreign Application Priority Data
Dec. 11, 2019    (JP) .................................. 2019-223993

(51) Int. Cl.
*G05B 13/02*    (2006.01)
*F16K 37/00*    (2006.01)

(52) U.S. Cl.
CPC ...... *G05B 13/0265* (2013.01); *F16K 37/0083* (2013.01)

(58) Field of Classification Search
CPC ............ G05B 13/0265; G05B 23/0243; G05B 23/0283; F16K 37/0083; F16K 37/0041; G16Y 10/25; G16Y 40/10; G16Y 40/20
See application file for complete search history.

(56) References Cited

U.S. PATENT DOCUMENTS 4,816,987 A    3/1989    Brooks et al.
5,487,302 A    1/1996    Casada et al.
(Continued)

FOREIGN PATENT DOCUMENTS

JP    2004-257419    9/2004
JP    2006-260539    9/2006
(Continued)

OTHER PUBLICATIONS

International Search Report issued Mar. 9, 2021 in International Application No. PCT/JP2020/046049.

*Primary Examiner* — Chad G Erdman
(74) *Attorney, Agent, or Firm* — Wenderoth, Lind & Ponack, L.L.P.

(57) ABSTRACT

A valve state grasping system, a display device and a rotary valve, a valve state grasping program, a recording medium, and a valve state grasping method that enable efficient valve system monitoring and accumulation of information. The system includes a valve V, a sensor unit, a server including a database, and a terminal device including a display unit, and a system control unit. The database includes a position information unit, a history information unit, and an inference information unit. The position information unit includes unique information and pipe attachment information, and the history information unit includes at least measurement information and diagnosis information. The system control unit accumulates information of the position information unit and information of the history information unit in association with each other and outputs predetermined infer- (Continued)

ence information from the inference information unit based on information of the position information unit and information of the history information unit.

14 Claims, 21 Drawing Sheets

(56) References Cited

U.S. PATENT DOCUMENTS

| | | | |
|---|---|---|---|
| 5,887,608 | A | 3/1999 | Bordelon et al. |
| 7,886,766 | B2 | 2/2011 | Radomsky et al. |
| 2015/0142340 | A1 | 5/2015 | Radomsky et al. |
| 2017/0153023 | A1 | 6/2017 | Fujiwara et al. |
| 2019/0194928 | A1* | 6/2019 | Boren .................... E03F 1/007 |

FOREIGN PATENT DOCUMENTS

| | | | |
|---|---|---|---|
| JP | 5011395 | | 8/2012 |
| JP | 2015-528085 | | 9/2015 |
| JP | 2018-73154 | | 5/2018 |
| JP | 2018073154 A | * | 5/2018 |
| JP | 6482742 | | 3/2019 |
| KR | 10-2019-0012325 | | 2/2019 |
| WO | 2015/186554 | | 12/2015 |
| WO | 2019/049522 | | 3/2019 |

\* cited by examiner (a)

(b)

(a)

(b)

(a)

(b)

VALVE STATE GRASPING SYSTEM, DISPLAY DEVICE AND ROTARY VALVE, VALVE STATE GRASPING PROGRAM, RECORDING MEDIUM, AND VALVE STATE GRASPING METHOD

TECHNICAL FIELD

The present invention relates to a valve state grasping system, a display device and a rotary valve, a. valve state grasping program, a recording medium, and a valve state grasping method. In particular, the present invention relates to a valve state grasping system, a display device and a rotary valve, a valve state grasping program, a recording medium, and a valve state grasping method that are suitable for diagnosis inference for a valve provided on a pipe line fixed for a long period of time.

BACKGROUND ART

Typically, a variety of piping facilities including various pipes and valves, and further including various actuators for automatically controlling these valves are provided in various locations including large facilities such as various plants and buildings, or small buildings such as houses and stores. In these piping facilities, for example, rotary valves such as ball valves and butterfly valves of 90-degree rotation type (quarter-turn type) are in high demand. Further, as actuators for driving these valves, pneumatic actuators, which are simple in structure, easy to downsize, and also excellent in cost, are often mounted on the valves.

In particular, rotary valves such as ball valves (in particular, floating valves) and butterfly valves, which are provided with a valve seat made of resin such as a PTFE or PEEK material and rotates while receiving continuous complicated and fine frictional action under the driving force of an actuator, are used as typical on-off valves or flow control valves in a wide variety of usage modes under many environments regardless of the area or location.

In such pipe lines to which valves are connected, in accordance with the state of fluid inside the pipe, the environment at the piping position, or the like, it is necessary to determine what type of valve is most suitable as each valve, estimate the service life and management cost of each valve, or review the design of a part or the whole of the pipe line. In order to meet this necessity, it is useful to accumulate and analyze information obtained from, for example, the history followed by valves by appropriately monitoring the valves. In addition, it is also necessary to perform precise state monitoring and anomaly detection on each valve. For example, a ball seat of a ball valve is the core of the valve function and also prone to state changes due to its material characteristics, and the part having the highest necessity of grasping its state in the ball valve in operation. Thus, information obtained from the state monitoring of each valve is required. Further, such a monitoring technique is preferably simply configured and easy to implement.

On the other hand. PTLs 1 and 2 have been proposed as monitoring techniques for acquiring information from a valve or an actuator provided on a specific pipe. In both of the techniques, a predetermined sensor can be simply attached to each valve, and the entire valve system is monitored based on information obtained from the individual valves via wireless communication from these sensors.

PTL1 discloses a ball valve monitoring system. A valve monitoring device fixed to the ball valve is capable of transmitting message to a valve device reader via short range wireless communication. The valve device reader is configured to be capable of transferring the message to a server by communication via Ethernet (registered trademark). This configuration achieves remote monitoring of the ball valve inside an industrial facility and improves process control.

PTL2 discloses an example in which, while an add-on type valve monitoring unit is attached, through a bracket, to the upper part of an actuator mourned on a quarter-turn valve, a sensor capable of reading an actuator state (an angular position of a stem) and transmitting an angle fluctuation signal to the monitoring unit is attached on the stem side of the valve, thereby enabling continuous monitoring of the state of the valve based on the angular position of the stem. For example, on a graph diagram of PTL 2, a graph of stern angles with respect to time is depicted, and a defective state of the valve is inferred based on its pattern.

Furthermore, as a system that accumulates information obtained from a device on a pipe line, PTL3 discloses a technique that accumulates diagnosis results obtained from a process device of a steam plant in association with the installation location of the process device and performs risk evaluation of the system based on this information.

In particular, in the description, when an input/output processing unit acquires diagnosis results transmitted from a monitoring device, the input/output processing unit additionally stores the diagnosis result of each process device in a diagnosis result storage unit in association with installation location identification information corresponding to device identification information of the process device, together with the device identification information. PTL3 further includes a risk information calculation unit that calculates risk information relating to the risk of the process device in the installation location. The risk information calculation unit calculates a risk index value indicating the susceptibility of the process device to failures in the installation location and a reliability indicating the accuracy of the risk index value.

CITATION LIST

Patent Literatures

PTL 1: Japanese Patent No, 5011395
PTL 2: Japanese Unexamined Patent Application Publication Translation of PCT Application) No, 2015-528085
PM 3: Japanese Patent No. 6482742

SUMMARY OF INVENTION

Technical Problem

However, since each valve provided on a specific pipe line is in specific use conditions including the piping position, incorporating, as information, the use conditions specific to each valve, in other words, the load condition into the monitoring or the like of valves disposed on the pipe can increase the range and accuracy of the user of output information, such as anomaly detection and state prediction for each valve or pipe line, and application to machine learning. For example, even valves hawing exactly the same valve type, size, and material differ in service life, required maintenance, or management cost depending on piping conditions, such as the piping position, specific to each valve.

On the other hand, the monitoring techniques disclosed in PTLs 1 and 2 are both techniques that perform monitoring using only valve information obtained from the sensor attached to the valve. Although information (such as rotation angle) obtained from the operating state of each valve can he acquired, information about the use conditions specific to each valve as described above is not taken into consideration, Thus, even if the techniques of these patent literatures are used, it is not possible to accumulate and use input information specific to a valve or a pipe line as described above. In PTLs 1 and 2, information required for more accurate valve monitoring, state prediction, and anomaly detection is insufficient, and valve-specific conditions needs to be taken into consideration to reasonably monitor the system with higher accuracy.

If such information is ignored, it is not possible to accurately predict, for example, the history of each valve under its specific use conditions.

Furthermore, although there is no direct reference in PTLs 1 and 2 to the accumulation of history information, for example, about maintenance performed on each valve, such history information is usually maintained for each valve by entering the information into a work report or the like. However, in this case, if one valve whose history information has already been acquired is replaced with a new valve, the acquired history information is practically reset, and thus not recorded as information obtained based on the piping conditions specific to the valve, but only accumulated as individual information of the valve. Thus, it is not possible to appropriately select a.

specific valve suitable for specific use conditions as described above or rationally review the selection. Furthermore, if the valves to be replaced are at least the same valves, the acquired history information can be used, but if they are not the same valves, the information cannot be used as it is, and the accumulated history information cannot be effectively used.

Furthermore, although in PTL 3 information obtained from the process device is accumulated, it is not possible to obtain the accumulated information specific to the valve. system as described above even by referring to PTL 3 because the monitoring target is different from the valve system and the information accumulated in the storage unit of PTL 3 is also different from the information described above. Specifically, information of each valve disposed on the pipe or the location of the valve on the pipe and use conditions is preferably effective and as little as possible, but there is no disclosure or suggestion in PTL 3 as to what kind of information should be used to identify each of these.

Furthermore, in PTL 3, diagnosis results as accumulated information obtained from the system are only simple information. In particular, real-time and detailed measurement values obtained from the operating state of the device are not used. Thus, output information is only for simple risk evaluation (paragraph [0043] of PTL 3), and it is not possible to perform highly accurate state inference on the valve placed on specific use conditions as described above. Only simple processing is performed on the accumulated information of PTL 3, and it is also extremely difficult to obtain useful output, for example, through application to machine learning.

Thus, the present invention has been developed to solve the above-described problems, and an object thereof is to provide a valve state grasping system, a display device and a rotary valve, a valve state grasping program, a recording medium, and a valve state grasping method that enable efficient valve system monitoring and accumulation of information also taking into consideration information obtained from a pipe line, thereby enabling highly accurate anomaly detection and state inference for each valve or pipe line.

Solution to Problem

To achieve the above-described object, the invention according to claim 1 is a valve state grasping system including at least: a valve provided on a pipe line; a sensor unit detachably attached to the valve; a server capable of wirelessly communicating with the sensor unit and including a database; a terminal device capable of communicating with the server and the sensor unit and including a display unit; and a system control unit, in which the database includes, inside thereof, at least a position information unit that is position information of the valve, a history information unit to be updated when work for the valve is required using information corresponding to the work, and an inference information unit that outputs inference information based on the position information unit and the history information unit, the position information unit includes at least unique information for identifying the valve and pipe attachment information specific to a position on the pipe where the valve is provided, the history information unit includes at least predetermined measurement information obtained by the sensor unit measuring an opening and closing operation of the valve and diagnosis information of the valve corresponding to the measurement information, and the system control unit is configured to accumulate, in the database, information of the position information unit and information of the history information unit in association with each other and output predetermined inference information from the inference information unit based on information of the position information unit or information of the history information unit.

The invention according to claim 2 is the valve state grasping system in which the system control unit is configured to, when acquiring new position information different from unique information and/or the pipe attachment information of the position information unit, output inference information from the inference information unit by diverting position information of the position information unit based on the new position information.

The invention according to claim 3 is the valve state grasping system in which the system control unit is configured to generate a predetermined feature value from measurement information in the history information unit, create learning data with a feature value of the history information unit associated with a learning label corresponding to diagnosis information of the history information unit for the valve in the same position information of the position information unit, and create or update a learning model that infers diagnosis information of the history information unit and outputs diagnosis inference information of the inference information unit through machine learning using the learning data.

The invention according to claim 4 is the valve state grasping system in which the system control unit is configured to create learning data with position information of the position information unit associated with a learning label corresponding to history information of the history information unit, and create or update a history model that outputs history inference information obtained by inferring history information of the history information unit through machine learning using the learning data.

The invention according to claim 5 is the valve state grasping system in which the valve is a quarter-turn rotary valve that rotates around a valve stem, the sensor unit includes a gyroscope built therein and is fixed to the valve stem rotatably together with the valve stem, the system control unit is capable of acquiring angular velocity graph information representing, in graph form, angular velocity information of the valve stem as measurement information of the history information unit, a feature value of the history information unit is a predetermined feature value generated from the angular velocity graph information, and diagnosis information of the history information unit is diagnosis information of the valve corresponding to the feature value.

The invention according to claim 6 is the valve state grasping system in which pipe attachment information of the position information unit includes a distance from the valve to an element that is disposed on a primary side and/or a secondary side and closest to the valve.

The invention according to claim 7 is the valve state grasping system in which the system control unit is configured to display angular velocity graph information of the valve obtained by the gyroscope on the display unit of the terminal device.

The invention according to claim 8 is the valve state grasping system in which the system control unit is configured to display, based on a predetermined predicted value obtained by applying predetermined state prediction means to measurement information of the history information unit obtained by the gyroscope, a graph having a vertical axis representing measurement information of the history information unit and a horizontal axis as a time axis from the present to the future on the display unit.

The invention according to claim 9 is a portable display device that is the terminal device used in the valve state grasping system and capable of wirelessly communicating with the server and the sensor unit.

The invention according to claim 10 is a quarter-turn rotary valve including the display device.

The invention according to claim 11 is a valve state grasping program for causing a computer to execute the valve state grasping system, The invention according to claim 12 is a recording medium storing the valve state grasping program.

The invention according to claim 13 is a valve state grasping method used in a valve state grasping system, the valve state grasping system including at least: a valve provided on a pipe line; a sensor unit detachably attached to the valve; a server capable of wirelessly communicating with the sensor unit and including a database; and a terminal device capable of communicating with the server and the sensor unit and including a display unit, wherein the database includes, inside thereof, at least a position information unit that is position information of the valve, a history information unit to be updated when work for the valve is required using information corresponding to the work, and an inference information unit that outputs inference information based on the position information unit and the history information unit, the position information unit includes at least unique information for identifying the valve and pipe attachment information specific to a position on the pipe where the valve is provided, the history information unit includes at least predetermined measurement information obtained by the sensor unit measuring an opening and closing operation of the valve and diagnosis information of the valve corresponding to the measurement information, the method comprising at least: a first step of accumulating, in the database, position information of the position information unit and history information of the history information unit in association with each other; and a second step of outputting predetermined inference information from the inference information unit based on position information of the position information unit or history information of the history information unit.

The invention according to claim 14 is the valve state grasping method in which the system control unit is configured to generate a predetermined feature value from measurement information in the history information unit, create learning data. with a feature value of the history information unit associated with a learning label corresponding to diagnosis information of the history information unit for the valve in the same position information of the position information unit, and create or update a learning model that infers diagnosis information of the history information unit and outputs diagnosis inference information of the inference information unit through machine learning using the learning data.

Advantageous Effects of Invention

According to the invention defined in claim 1, the system has a simple system configuration provided with the sensor unit, which is easy to retrofit. In the system, history information of each valve is associated with position information specific to the valve and stored in the database. Thus, it is possible to effectively and rationally accumulate and manage the history information in accordance with piping conditions specific to each valve. In addition, incorporating information reflecting use conditions specific to each valve can increase the usefulness of the accumulated information and increase, for example, the accuracy of inference information.

In particular, in the case of a large-scale pipe line with a large pipe diameter, the piping layout tends to be maintained over a long period of time. In such a pipe line unchanged for a long period of time, maintenance or replacement are frequently performed especially on valves used at a specific position on the pipe. Thus, the utility value of information specific to the position increases. In addition, since the total length of time the valves are used at this position is long, the amount of sample data obtained from the position is also large, and a sufficient amount of information can thus be accumulated. Thus, such a pipe line is particularly preferred as a pipe line to which the system of the present invention is applied.

According to the invention defined in claim 2, the inference information can be output for a new valve that does not correspond to the existing accumulated information, which largely increases the usability of the system, In addition, since the existing information can be used for the new valve, the timing of maintenance or replacement can be inferred at an early stage.

According to the invention defined in claim 3, combined with the application of highly accurate machine learning that also incorporates information specific to each valve, developments in machine learning technology in recent years, and improvement in performance of calculators and data storage, it is possible to acquire highly accurate diagnosis inference information specialized for the target.

According to the invention defined in claim 4, the association between position information and history information enables the application of machine learning using the position information as an explanatory variable and the history information as an objective variable. Thus, detailed future prediction for the valve disposed on the pipe can be made based on the position information.

According to the invention defined in claim 5, since the history information includes a predetermined feature value included in the angular velocity graph and the diagnosis information corresponding to the feature value, the history information, which is simple information based on the angular velocity, can be applied to highly reliable machine learning. Furthermore, by appropriately selecting and modeling effective information, the information can be widely applied to pipe lines. This also enables highly accurate state grasping for quarter-turn type rotary valves, which have become widespread in various scenes and are in high demand, regardless of whether the valves are manual or automatic valves.

According to the invention defined in claim 6, the pipe attachment information includes the distance to the closest element on the primary side and/or the secondary side, which is one important piece of information that directly affects the performance of the valve. Thus, it is possible to increase the usefulness of the pipe attachment information specific to the position where the valve is disposed on the pipe only with simple information and increase the accuracy of inferring the timing of maintenance or replacement of the valve using this information.

According to the invention defined in claim 7, since the angular velocity graph is displayed on the display unit, the entire rotational frictional motion can be displayed with high accuracy and clarity using angular velocity. Thus, the operating conditions in which the valve opens and closes are easy to see at a glance, and extremely convenient valve monitoring mean can be achieved.

According to the invention defined in claim 8, the graph having the vertical axis representing measurement information and the horizontal axis as a time axis from the present to the future is displayed on the display unit based on a predetermined predicted value obtained by predetermined state prediction means. Thus, prediction of a measurement value of a valve is easy to see at a glance, which increases the predictability for the continuous use of the valve.

According to the invention defined in claim 9, it is possible to provide the display device that can be easily applied to the existing pipe line and has high portability without using a large-scale system such as a central control system for the pipe line.

According to the invention defined in claim 10, the state of the valve can be grasped in the opening/closing range of 90 degrees, and the timing of maintenance or replacement of the valve can be inferred. Thus, the value in use thereof is extremely high.

According to the invention defined in claim 11, it is possible to provide the extremely useful program that enables execution of valve state grasping without the need for skilled operators.

According to the invention defined in claim 12, the recording medium recording the valve state grasping program is provided. Thus, the valve state grasping program can be provided as the recording medium that is low-cost, easy to carry, store, and replace, and applicable to various devices.

According to the invention defined in claim 13, history information of a valve is associated with position information specific to the valve and stored in the database. Thus, it is possible to accumulate and manage the history information in accordance with piping conditions specific to each valve. In addition, incorporating information reflecting use conditions specific to each valve can increase the usefulness (inference ability) of the accumulated information, for example, increase the accuracy of machine learning using this information.

According to the invention defined in claim 14, combined with the application of highly accurate machine learning that also incorporates information specific to each valve, developments in machine learning technology in recent years, and improvement in performance of calculators and data storage, it is possible to acquire highly accurate diagnosis inference information specialized for the target.

BRIEF DESCRIPTION OF DRAWINGS

FIG. 2($b$) is a perspective view depicting an example of a ball valve with the sensor unit attached thereto.

DESCRIPTION OF EMBODIMENTS

Figure 1:
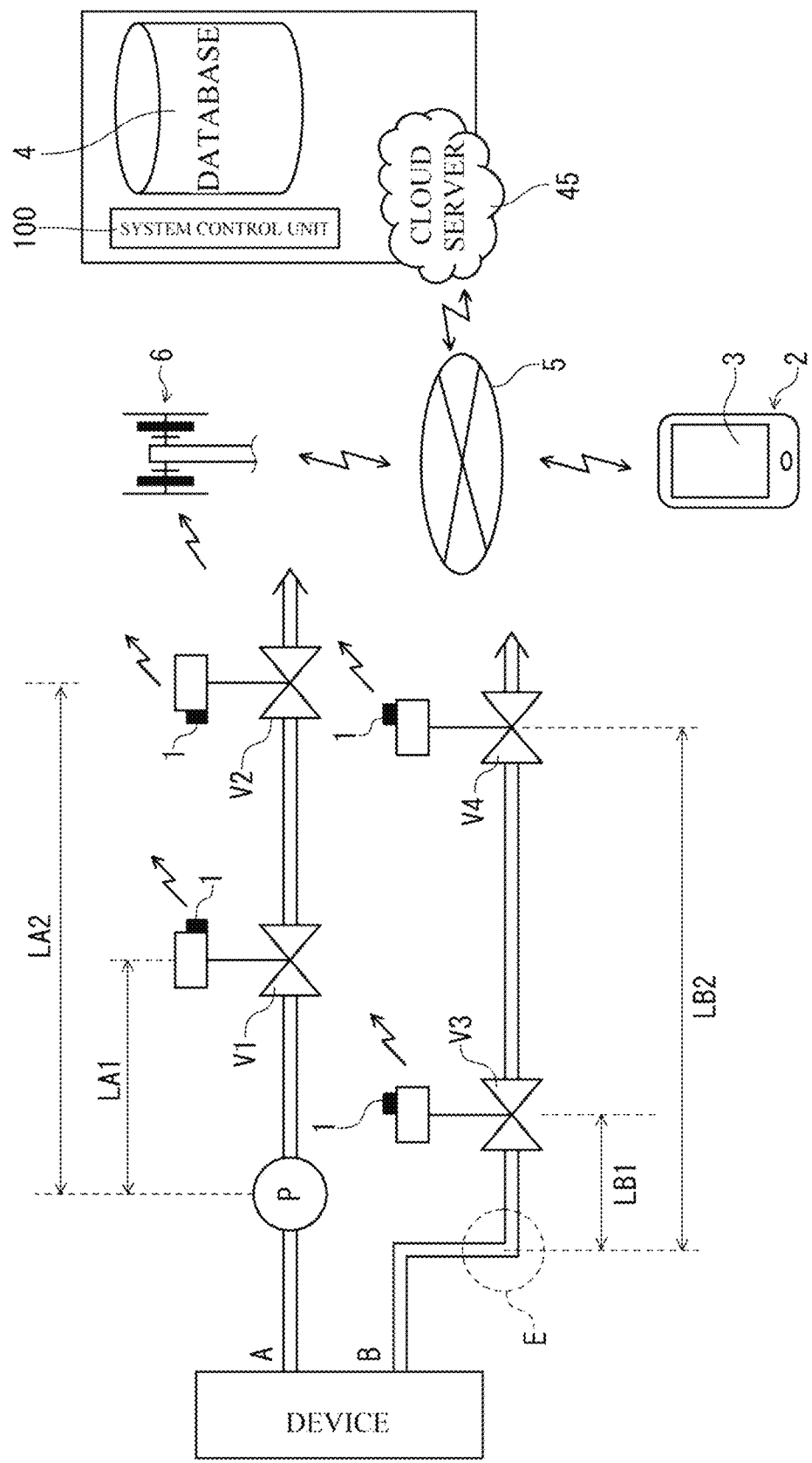
FIG. 1 is a schematic diagram depicting an example of the entire configuration of a valve state grasping system of the present invention.

Hereinbelow, a valve state grasping system (hereinbelow, merely referred as "the system") in an embodiment of the present invention will he described in detail with reference to the drawings. In FIGS. 1. 3, and 8. the system of the present invention includes at least a valve V (V1 to V4), a sensor unit 1, a server 45 including a database 4, a terminal device 46, 47, and a system control unit 100. The database 4 includes, inside thereof, at least a position information unit 101, a history information unit 102, and an inference information unit 103. Position information, history information, and inference information are accumulated in the information units 101, 102, and 103, respectively.

FIG. 1 is a schematic diagram concretely depicting an example of the configuration of the system in the present embodiment. FIG. 1 depicts a device used fir, for example, a heat source, chemical refining, water purification, or purification, pipe lines A and B connected to the device, the valves V1 to V4 provided on the pipe lines A and B, a pump P as an example of a piping device, a sensor unit 1 attached to all or some of the valves provided on the pipe lines, a gateway 6 capable of wirelessly communicating with the sensor unit 1, a server 45 communicably connected to the gateway 6 via a network (the Internet 5) communicably connected to the gateway 6, and a display device 2 (terminal devices 46 and 47). Note that the server 45 may be a cloud server as will be described further below, and the system control unit 100 and the database 4 or the like are stored in the server 45.

[Configuration of System]In the system of the present embodiment, the valve V is a quarter-turn (90-degree rotation) type rotary valve and, in particular, a ball valve or a butterfly valve. As an example of the ball valve V equipped with an actuator 7, the sensor unit 1 described further below is attached to the actuator 7 as depicted in the perspective view of FIG. 2(b). Note that the state of being attached to the valve includes the state of being attached to the valve through another device such as an actuator in this manner.

inside the database 4, the position information unit 101 and the history information unit 102 associated with each other by the system control unit 100 are accumulated. The system control unit 100 outputs predetermined inference information based on the position information and the history information, and details of the output are also accumulated inside the database 4. Such association makes it possible to effectively manage the history information with information about use conditions specific to each position (the valve and a position on the pipe where the valve is attached) and use the information as the inference information.

Figure 3:
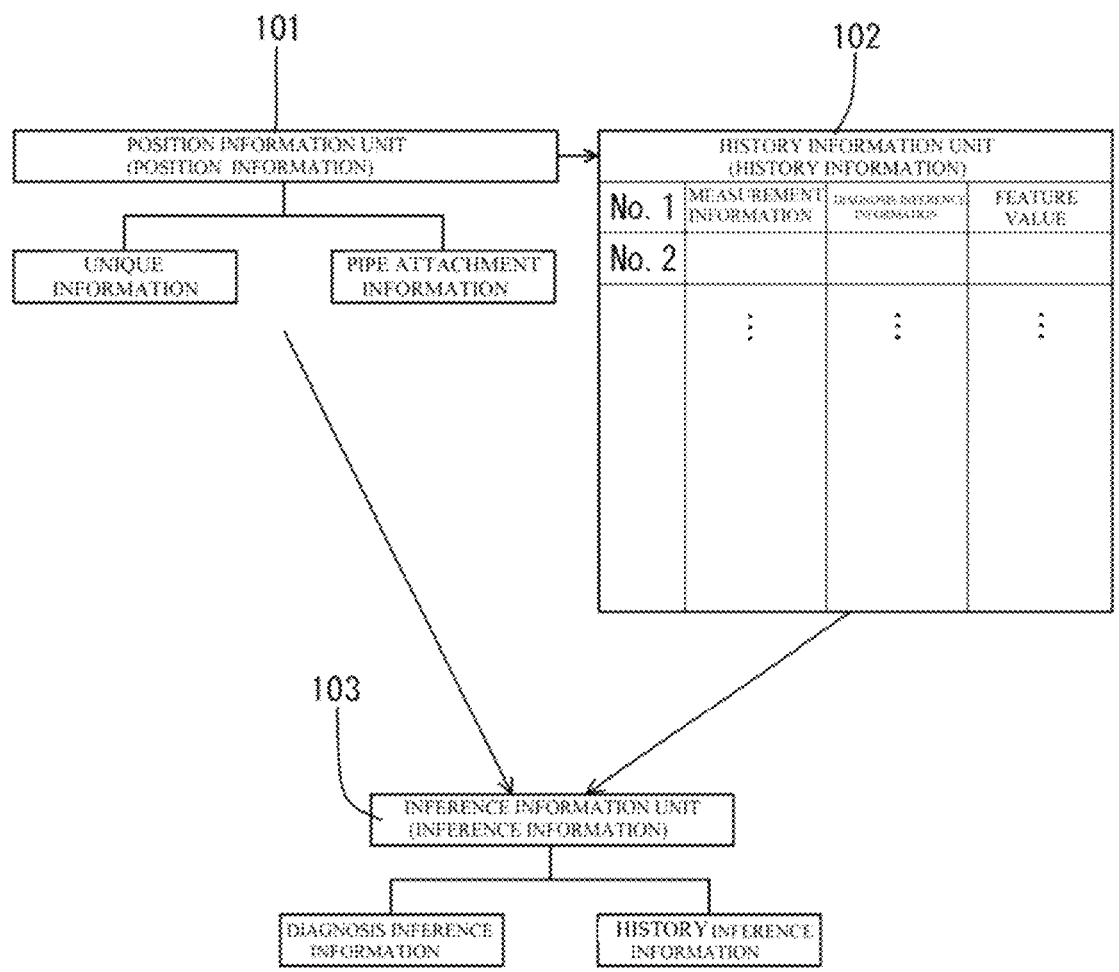
FIG. 3 is an explanatory diagram depicting an example of a data structure of the present invention.

FIG. 3 depicts an example of a data structure in the position information unit 101 and the history information unit 102 inside the database 4.

The position information unit 101 includes position information about the position of the valve and includes, as the position information, at least unique information and pipe attachment information of the valve. The position information unit 101 may include information other than the unique information and the pipe attachment information, and various types of information can also be accumulated in accordance with implementation.

The position information is information that can identify a state in which a specific valve is provided at a specific position on a specific pipe line by a combination of pieces of data such as a numerical value and a symbol and can be controlled by the system control unit 100. The system control unit 100 is a control unit including at least a program that controls various data processing operations described further below and stored on the server 45 of the system, The unique information of the position information is provided to individually identify valves. Although not depicted, examples of the unique information of the valve include the order number and user-management number of the valve, the valve type classified according to the form and function of the valve, the (main) material and nominal diameter of the valve, fluid handled by the valve, the characteristics, such as pressure, of the fluid, the flow rate and opening/closing frequency of the valve, and the type and performance of the actuator. In the case of a ball valve, examples of the unique information include various types of information such as the material and wear coefficient of the ball seat and the packing, and the size of the ball and the flow channel. Basically, valve information on the valve specifications is converted into a predetermined numerical value or symbol and held.

On the other hand, the pipe attachment information is information about the position of the valve provided on the pipe. When, for example, the valve, which is a specific element, is disposed on the pipe line A, B in FIG. I as piping, the pipe attachment information is identified as information specific to each element.

The pipe lines A and B may be either for flowing into the device or flowing out of the device. One pipe line may be defined as appropriate in accordance with implementation, and may be defined as, for example, a line that handles the same fluid. In this case, one pipe line means a pipe structure with continuous internal connection necessary for the same fluid to flow from upstream to downstream in a predetermined section.

Although not depicted, pipe attachment information of the position where a certain valve is disposed includes at least the distances to elements (including three or more elements if any) closest to the valve on the primary side and the secondary side of the valve. In the case of FIG. 1, pipe attachment information of the valve V1 includes a distance LA1 to the pump P adjacent to the valve V1 on the left side in FIG. 1 and a distance (LA2-LA1) to the valve V2 adjacent to the valve V1 on the right side in FIG. 1. Similarly, pipe attachment information of the valve V3 includes a distance LB1 to an elbow E adjacent to the valve V3 on the left side in FIG. 1 and a distance (LB2-LB1) to the valve V4 adjacent to the valve V3 on the right side in FIG. 1. Note that, in the present embodiment, the pump P and the elbow E are depicted as examples of an element that changes the flow rate of fluid inside the pipe, Examples of other pipe attachment information may include information about the elements adjacent to the valve relating to the pipe attachment information and the valve itself (for example, the pump P and the valve 2, and also the opening/closing frequency of the valve V2 in the case of the valve V1, and the elbow E and the valve V4, and also the opening/closing frequency of the valve V4 in the case of the valve V3), information about spatial arrangement of the valve such as the distance from a starting point or an end point of the pipe line to the valve (may be a distance on the pipe or a spatial distance) and the orientation or angle of the pipe, the height from the floor, and the distance or arrangement relationship with other devices of the valve, information about the temperature and humidity of a use environment where the valve is located or changes thereof, the distinction of the pipe type as to whether the pipe to which the valve is connected is a main pipe or a branch pipe, information about the presence or absence and intensity of vibration, a corrosive atmosphere, or an electromagnetic wave in the use environment, or stress applied to the valve from the pipe, information about the pipe diameter and fluid actually used (temperature, pressure, flow rate, etc.), and.

information about whether the valve is in use conditions that meet the manufacturer's warranty conditions. These pieces of pipe attachment information are each converted into a predetermine numerical value or symbol and held as with the unique information.

The pipe attachment information is information that appropriately extracts a factor affecting the flow of fluid handled by the valve and converts the extracted factor into data, and any information can be selected as appropriate in accordance with implementation. However, if too much information is included, the position information described further below will be difficult to use for a new valve. Thus, the pipe attachment information should include only the minimum amount of effective information possible.

Also, examples of the elements of the pipe line in the pipe attachment information described above may include various types of piping devices provided on the pipe line, such as a valve, a pump, and a tank, pipe parts that affect the flow of fluid in the form other than a straight pipe, such as a branch (tees), a bend (elbow), and a contraction, and a joint (flange) and a support part.

In addition, the history information in the history information unit 102 of FIG. 3 includes at least predetermined measurement information obtained by the sensor unit I measuring the opening and closing operation of the valve V and diagnosis information obtained by diagnosing the valve V corresponding to this measurement information. The history information unit 102 also includes a feature value described further below in addition to the measurement information and the diagnosis information and may further include other additional information. Various types of information can be accumulated in the history information unit 102 in accordance with implementation.

The measurement information can be acquired in response to driving of the opening and closing of the valve V with the sensor unit 1 attached thereto. In the present embodiment, as will be described further below, the sensor unit 1 provided with a gyroscope 8 can acquire predetermined measurement information (such as angular velocity information), and the system control unit 100 described above can acquire a predetermined feature value (the feature value representing a feature required for machine learning as a variable with a quantitative value) from the measurement information. As will be described further below, as the feature value, in addition to data itself of a two-dimensional angular velocity graph image of the angular velocity graph information, a set of predetermined feature values extracted from the angular velocity graph information can be used.

The diagnosis information is obtained by converting all pieces of information (symptom) that can be acquired as valve diagnosis results into data based on the measurement information. Examples of the diagnosis results include general symptoms common to all types of valves such as valve seat leakage, valve box leakage, foreign matter jamming, and actuator failure, symptoms depending on the types of valves such as displacement or deformation, wear, or partial breakage of the ball seat in the case of a ball valve, the intrusion of fluid into a cavity, stem deformation, and corrosion or damage to a specific part caused by a special use environment, and any diagnosis result can be set as appropriate in advance with implementation. These diagnosis results are appropriately converted into uniquely identifiable numerical values or symbols to constitute the diagnosis information.

When at least some kind of work such as maintenance is performed on the valve V with the sensor unit 1 attached thereto in the event of an anomaly, the above-described history information including the measurement information and the diagnosis information is used to record and accumulate predetermined information corresponding to details of the work in the database 4, For example, as will be described further below, when a notification of an anomaly of the valve V is made from the sensor unit 1 or the like, necessary work is performed on the valve, diagnosis information about a symptom of the valve V obtained at this time is recorded as history information, and a feature value corresponding to an operation at the anomaly is also recorded corresponding to the diagnosis information.

Thus, while the history information unit 102 includes at least a feature value obtained based on the above-described measurement information and diagnosis information about the symptom of the valve opening and closing operation obtained when the sensor unit 1 records the feature value, the history information unit 102 may also include predetermined information corresponding to the work in addition to these pieces of information. For example, when work is performed on the valve V whose anomaly has been notified as described above, the work is typically recorded as information required in a predetermined format such as a work report. Such information may be included in the history information (as data). For example, although not depicted, in the case of work for replacing the ball seat of a ball valve, the amount of damage to the ball seat such as the amount of wear or swelling, or, if scale adheres to the ball seat, the type and weight, location, or thickness of the scale may be included in the history information as data in a predetermined format.

Basically, when an anomaly of the valve V is recognized as described above, various pieces of information about the valve V are recorded as the history information in the database 4 in this manner. However, the history information unit 102 may include not only information during anomalous conditions, but also information during normal conditions (when no work is performed). In this case, the history information can also be treated as periodic information about the valve V at predetermined time intervals. Note that while each piece of history information (record) may be numbered as depicted in FIG. 3. each record is not intended to be treated as time-series data as will be described further below. Thus, the history information including these records does not need to be time-ordered and can also be appropriately combined or divided for use as in the case of diversion described further below.

The position information of the position information unit 101 and the history information of the history information unit 102 may have either a one-to-one correspondence or a one-to-many correspondence. In the present embodiment, taking into consideration that a plurality of valves may he replaced and used at a specific position (piping position), for example, the pipe attachment information and the unique information have a one-to-many correspondence. When the history information corresponds to each individual valve, the position information of the position information unit 101 and the history information of the history information unit 102 have a one-to-one correspondence, On the other hand, when the history information corresponds to one certain piping position, the position information and the history information have a one-to-many correspondence.

Here, an example of the correspondence between "position information" of the position information unit 101 and "history information" of the history information unit 102 will be described.

First, as "unique information" of "position information", the nominal pressure, nominal diameter, material, and type of a valve, for example, a Class 150 floating type ball valve made of SUS304 and having a nominal diameter of 100 A (as data actually input, "15OUTB100", which is the model number of the valve manufactured by the applicant) is used.

Second, as the user-management number, for example, "P01AV1-01" (which means the plant number P01, the pipe line A, the valve number V1, the version number 01) is used, Third, as fluid information, for example, "powder" or "fluid temperature" is used. These are examples, and information such as the opening/closing frequency may be added.

Furthermore, as "pipe attachment information" of "position information", the distance to the pump adjacent to the valve on the upstream side, for example, "LA1" is used as described above.

Next, as "history information", "start date of use" is input as "measurement information", and "N/A" is input as "diagnosis information" and "feature value" for data No. 1.

Next, for data No. 2, "opening/closing count: 1,000 times" is input as "measurement information", "the ball seat has 1 mm wear" is input as "diagnosis information", and "a peak value $T_2$ of the angular velocity at an opening degree in the middle has increased by approximately 30%" is input as "feature value".

Also, for data No. 3, "opening/closing count: 10,000 times" is input as "measurement information", "stoppage of" operation due to sticking is input as "diagnosis information", and "the angular velocity is zero at an opening degree in the middle" is input as "feature value".

When the valve is replaced. "unique information" of the position information unit 101 is changed. For example, "P01AV1-02" (which means the plant number P01, the pipe line A, the valve number V1, and the version number 02) is used. There is no change in "pipe attachment information". In this manner, "pipe attachment information" and "unique information" in the position information unit 101 have one-to-many correspondence, As described above, information including "measurement information" in addition to "unique information" and "pipe attachment information" as "position information" of the position information unit 101 and "diagnosis information" and "feature value" as "history information" of the history information unit 102 is used.

Note that the word "input" used in the above description includes not only manual input, but also automatic input from a sensor or the like. Also, while information is input in the form of explanatory text such as "the angular velocity has increased by 30%", the input form is not limited thereto, and information may be input in the form of a parameter and a numerical value.

In the system of FIG. 1, the gateway 6 is communicably connected to the sensor unit 1, or the display device 2 and the server 45 and has a function of, for example, managing and controlling these. The gateway 6 is also communicably connected to an access point (not depicted) and thus connectable to the sensor unit 1 or the display device 2 capable of communicating with the access point. For example, the gateway 6 acquires information such as angular velocity information (angular velocity data) of the valve V measured by the sensor unit 1 and transmits the information to the server 45 and the display device 2. Also, the gateway 6 acquires information from the database 4 and transmits the information to the display device 2. Furthermore, the access point may be a wireless device capable of connecting the sensor unit 1 or the display device 2 to an external network of the system, such as the Internet 5, and a router function may be provided on a separate body.

Figure 4:
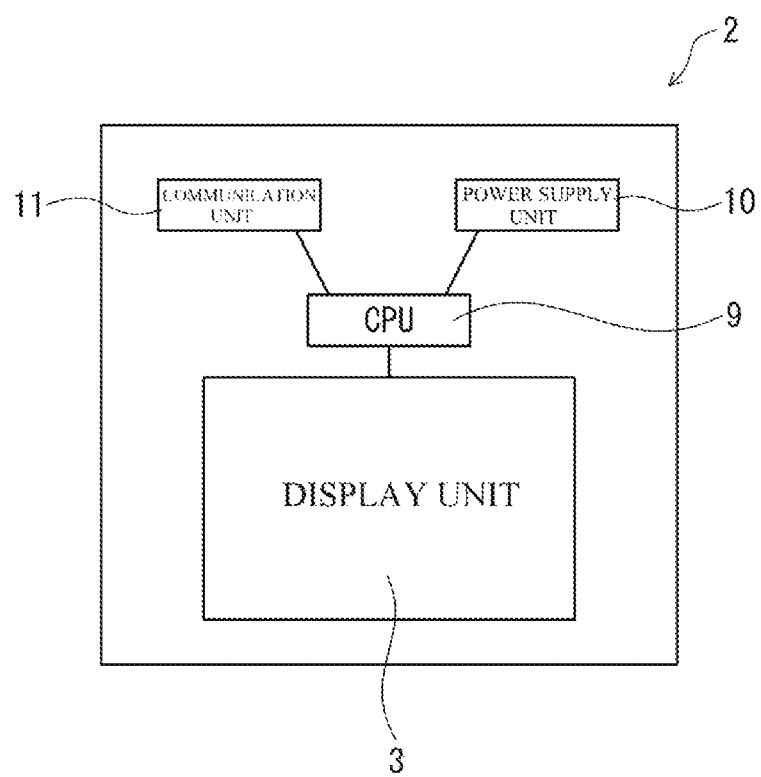
FIG. 4 is a block diagram of a display device of the present invention.
Figure 6:
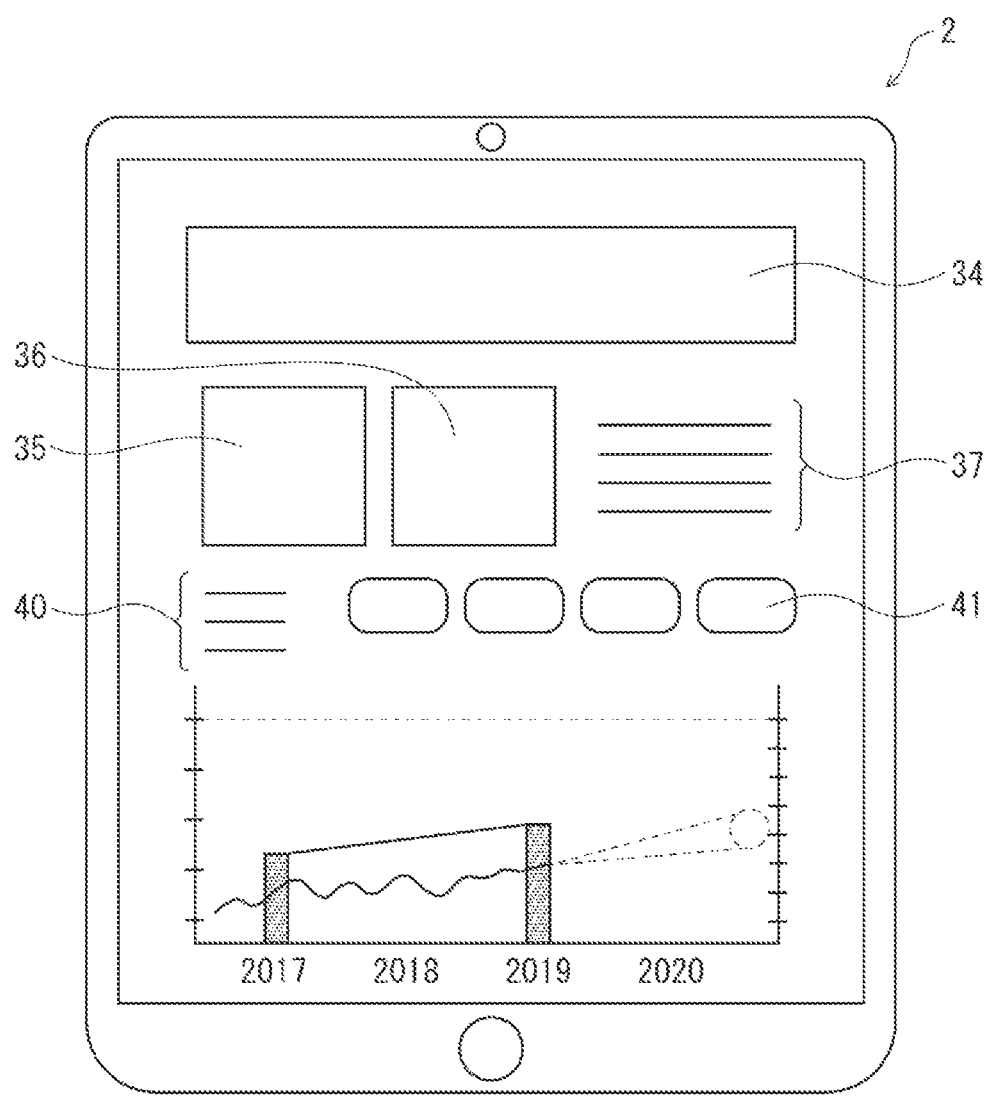
FIG. 6 is an explanatory screen diagram schematically depicting a state prediction mode displayed on a display unit of the display device of the present invention.
Figure 7:
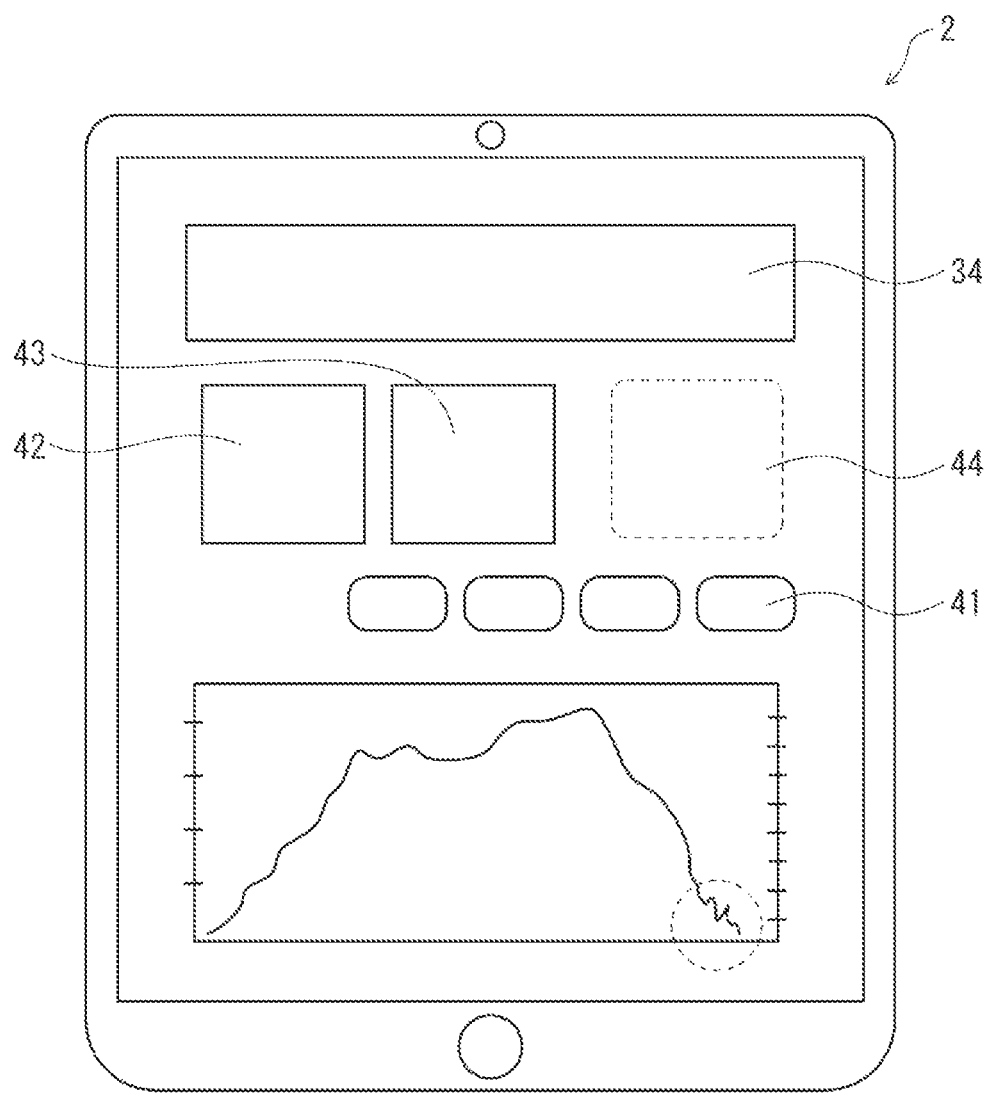
FIG. 7 is an explanatory screen diagram schematically depicting an anomaly display mode displayed on the display unit of the display device of the present invention.

FIG. 4 is a block diagram schematically depicting an example of the configuration of the display device 2. The display device 2 of the present embodiment is a tablet of about 8 to 13 inches and preferably has a size suitable for displaying a screen as depicted in FIGS. 6 and 7 described further below. A device capable of installing a predetermined application required for the screen display depicted in FIGS. 6 and 7 is used as the display device 2. As the display device 2, a general-purpose device such as a tablet, a smartphone, or a personal computer, or a predetermined dedicated display device may be used, and any device can be selected as appropriate in accordance with implementation.

The display device 2 is a portable computer including a CPU 9 (including a control unit including a processor and a memory including a ROM, a RAM, etc.), a power supply unit 10, a display unit 3 (user interface), and the like. The user interface includes, for example, a display such as a liquid crystal display (LCD), and an input device such as a keyboard or a touch panel The CPU 9, the power supply unit 10, a communication unit 11, and the display unit 3 are electrically connected to each other. The power supply unit 10 is capable of supplying the CPU 9, the communication unit 11, and the display device 3 with current. The communication unit 11 is capable of transmitting and receiving data in the database 4 from and to the system control unit 100 to the display device 2 via the external network (Internet) 5 under the control of the CPU 9.

The display unit 3 is, for example, a touch panel display and implemented with a liquid crystal panel, an organic EL panel, or other panels. A predetermined program executed by the control unit and a predetermined application downloaded via the network 5 can be stored in the memory (not depicted). For example, the control unit operates in accordance with a control program to execute a process of controlling the communication unit 11, the display unit 3, and the like.

The display device 2 in the drawings is an example of the terminal device including the display unit 3. For the system of the present invention, any terminal device that is capable of communicating with the sensor unit 1 and the server 45 wirelessly or via a wire and provided with a predetermined calculation function and an input/output interface, such as the display device 2, or a table 46 or a PC 47 depicted in FIG. 8 described further below, can be selected in accordance with implementation,

[Valve and Sensor Unit]

Next, the sensor unit 1 attached to the valve V will be described. FIG. 2(a) is a block diagram depicting an example of the configuration of the sensor unit 1. As will be described further below, the system in the present invention performs state monitoring, diagnosis, and life prediction of the valve through the system control unit 100, the position information unit 101, the history information unit 102, and the inference information unit 103, based on, for example, angular velocity data of a valve stem that opens and closes the valve V. The angular velocity data also includes data represented as an angular velocity graph in response to a rotational motion of a valve disk (a ball 30 of FIGS. 17 to 21) from a fully-open or fully-closed stale to a fully-closed or fully-open state, the data. being obtained from the sensor unit 1.

The sensor unit 1 includes at least the gyroscope 8 (angular velocity sensor) as a motion sensor. The gyroscope 8 is a vibrating-type gyroscope using IC-type micro electric mechanical system (MEMS) technology, and is of a semiconductor type and mounted on an internal board. The configuration of the sensor unit 1 is not limited to the configuration of FIG. 2(a), and any configuration can be selected in accordance with implementation.

The gyroscope 8 is a rectangular semiconductor device. The gyroscope 8 is mounted on the internal board in such a manner as to be parallel to the short and long sides of the sensor unit 1 having a rectangular shape and incorporated in the sensor unit I in this state. In this case, the sensor unit 1 is attached in an orientation parallel to the XY plane. In this state, the yaw axis of the gyroscope 8 is aligned with the Z-axis direction, and the roll axis and the pitch axis thereof are aligned with the Y-axis direction and the X-axis direction, respectively. As long as the gyroscope 8 is fixed rotatably together with the valve stem (control shaft 18), any attachment position, angle, and orientation of the sensor unit 1 can be selected in accordance with implementation.

As the gyroscope 8. for example, a triaxial gyroscope capable of measuring rotation in three orthogonal XYZ-axis directions is used, and various gyroscopes mounted on various general consumer devices can be used. In the present example, "L3GD20", which is a product manufactured by STMicroelectronics, is used, and its characteristics are as follows: power supply voltage: DC 3.3 V (operating range: DC 2.4 V to DC 3.6 V); current consumption: 6.1 mA; and measurement range: ±250 dps (resolution power: 0.00875 dps), ±500 dps (resolution power: 0.0175 dps), and ±2000 dps (resolution power: 0.07 dps). However, it is needless to say that these characteristics are not restrictive, and any selection and adjustment can be performed in accordance with implementation.

The gyroscope 8 has particularly high electric power consumption, and the sensor unit 1 of the present invention is not connected to an external commercial power source and used independently for a long period of time at a level of several years at the longest. Thus, when the gyroscope 8 is used as a sensor, it is important to select a combination of the gyroscope 8 and a power supply 15 described further below from the viewpoint of power saving, and the power saving function is also important. For example, a CPU12 may he normally kept in a power saving state so that the CPU 12 receives data from the gyroscope 8, whereas the received data is not accumulated in a memory 13. When the operation of the actuator 7 is detected, the power saving state may he cleared, and at least angular velocity data detected by the gyroscope 8 may he accumulated in the memory 13. When no operation of the actuator 7 is detected for a predetermined time, the CPU 12 may return to the power saving state. Note that, for the power saving function, for example, a gyroscope of a self-generation type (such as vibration power generation or photovoltaic power generation) may be used.

In addition, the sensor unit 1 also includes at least the CPU 12 (central processing unit), the memory 13, a communication module 14, the power supply 15, an IC tag 16, and a temperature sensor 17. The sensor unit 1 may further include an acceleration sensor and a magnetic sensor (both not depicted) in addition to the above-described gyroscope 8 in combination for use in the system of the present invention.

Also, for power saving, a piezoelectric sensor and an acceleration sensor may be used in combination to activate the gyroscope when necessary. Note that a sensor that measures angle such as an encoder may be used as means for measuring angular velocity, and the CPU 12 may perform a computation to calculate the angular velocity from the measured angle.

The CPU 12 is meant to include a cache, one with general specifications can be used, and any one can be selected in accordance with implementation. In particular, the CPU 12 requires processing power to achieve each function described further below (in particular, the power saving function). The CPU 12 is connected to peripheral elements such as the memory 13 and the communication module 14 via a bus. As with the CPU 12, any memory having power (capacity and speed) to achieve each function described further below is selected as the memory 13 in accordance with implementation. If continuous power supply is not assumed, a nonvolatile memory is preferred. Furthermore, the memory 13 preferably has sufficient capacity to load various applications that execute the power saving function and the like.

The communication module 14 is desirably a near-field wireless communication module. In the present example, Bluetooth (registered trademark) is used. As will be described further below, at least the angular velocity data obtained by the gyroscope 8 and its transition are communicated with the external display device 2 via the communication module 14. The display device 2 enables the state of an automatic valve to be recorded, and displayed and checked through a dedicated application. Also, instead of Bluetooth (registered trademark), infrared rays, Wi-Fi Direct, specific power saving such as LoRa (920 MHz band), or the like can also be used.

The power supply 15 also includes a predetermined power conversion circuit, and any power supply is selected in accordance with implementation. For example, the power supply 15 is an independent power supply using a button buttery or a battery power supply and may also include a photovoltaic power generation element or a vibration power generation element. For example, in the case of the button battery, a disk-shaped battery cover is engaged with and fixed to a hole formed on the lid body through a seal member (not depicted) at its attachment/detachment position and attachable and detachable by being turned by a predetermined angle using a fiat blade screwdriver or the like. The power supply 15 servers as a driving source for the elements including the gyroscope 8, the CPU 12, the memory 13, and the communication module 14, which are connected to the power supply 15.

In this manner, the power supply 15 is a primary battery that can drive the elements for a period sufficient to measure a series of data of the valve V or a secondary battery that, in combination with a power generation element, enables measurement similar to that performed using the primary battery.

In the IC tag 16, unique information of the actuator 7 or the valve V is accumulated. The information includes at least the model type and the order number of the actuator 7 or the valve V, and these pieces of information are input using a dedicated terminal (not depicted) or the like. The URL for downloading application software for mobile terminals is also accumulated in the IC tag 16 so that the application software can be acquired from the URL for downloading, When the above-described sensor unit 1 is attached to the valve stem of the valve V, the sensor unit 1 housed in a case (housing means) is detachably fixed to the valve stem with a fitting 19.

Figure 2:
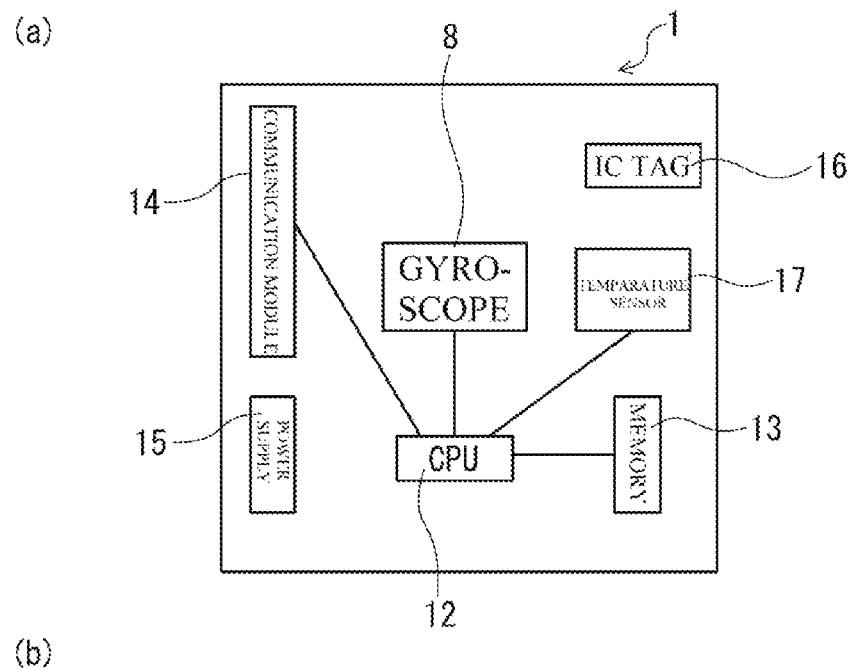
FIG. 2($a$) is a block diagram of a sensor unit of the present invention, and FIG.
Figure 2:
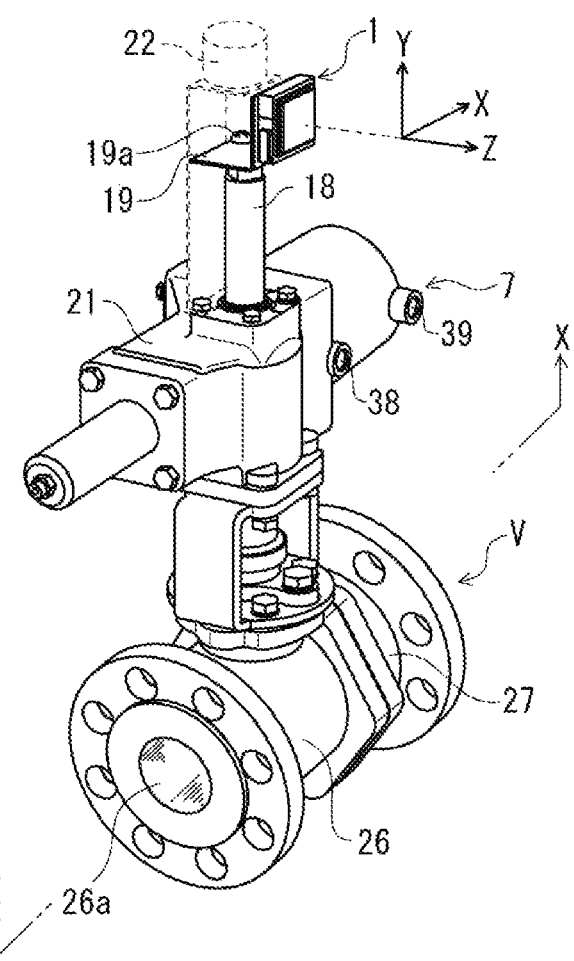

In this case, as depicted in FIG. 2(*b*), for the case (housing means) of the sensor unit 1, any outer shape, material, and others can be selected in accordance with implementation as long as the case is compact enough in size and weight to be easily held and carried with one hand. In the present example, for example, the case is a resin housing formed in a rectangular plate shape having a length of approximately 15 cm x 10 cm and a thickness of approximately 3 cm and having a weight of approximately several hundred grams as a finished product, On the front side thereof, product information, the product number, attachment direction (method of use), or the like is displayed. On the back side thereof, a predetermined attachment part (not depicted) such as a female threaded hole or an adhesive surface is provided, and the fitting 19 can be attached to the attachment part. Alternatively, for example, the case may be formed in a circular disk shape having an approximately similar size to the above.

The fitting 19 is an example of attachment means and complies with the NAMUR standard. In the present example, the fitting 19 is formed of an L-shaped metal plate, and has one side face serving as an attachment face fixed to the back face of the sensor unit 1 and the other face fixed to the upper end part of the control shaft 18 of the actuator 7 with a bolt 19*a* , Here, the NAMUR standard is the basic interface standard (VDI/VDE3845-2010) for actuators and defines the dimensions for valve attachment and attachment of an accessory on the upper part of the actuator. The actuator 7 is desirably attached in accordance with the NAMUR standard. In this case, the upper end part of the control shaft 18 has a female threaded portion (not depicted) that complies with the NAMUR standard. Thus, the sensor unit 1 can be easily retrofitted to the actuator 7 through the fitting 19 by using the female threaded portion. The actuator 7 may he attached using an attachment structure other than the NAMUR standard.

Furthermore, in an actuator that is already in use, an accessory device such as an open/close limit switch may he attached to the upper part of the control shaft 18. Also in this case, by using the L-shaped metal plate (fitting 19) of the present example, it possible to attach the sensor unit 1 to the control shaft 18 while leaving a space above the control shaft 18 with the accessary device attached thereto.

While the sensor unit 1 is attached to the control shaft 18 using the fitting 19 in the present example, the sensor unit 1 may be attached to an output shaft (not depicted) on the valve V side, the output shaft being connected to the control shaft 18, through appropriate attachment means.

The above-described sensor unit 1 has at least a function of measuring data and a function of accumulating the measurement data as part of a function of monitoring and grasping the state of the target device (the valve V or the actuator 7). The data to be measured includes at least angular velocity data per time or per opening/closing count at the control shaft 18 of the actuator connected to the stem (not depicted) of the valve V, and the data is output from the gyroscope 8, subjected to data proceeding in the CPU 12, and accumulated in the memory 13. In this case, the data is converted into data in a format displayable as a graph on an external monitor. Also, these pieces of data may be set so as to he accumulated in the memory 13 after at least simple data processing is performed. For example, so-called "decimation" may he performed so that these pieces of data are accumulated in the memory 13 from the CPU 12 at regular intervals, or data averaging or predetermine filtering (noise removal) may be performed. The accumulated data is transmitted to the display device 2 and the server 45 via the near-field wireless communication module 14, which is Bluetooth (registered trademark), in response to a request from the display device 2. By using the display device 2, the recordings of the state of the actuator 7 or the valve V are displayed and checked, and also accumulated in the history information unit 102 inside the server 45.

As will be described further below, the sensor unit 1 can includes various functions required in a process (flow including various process steps) of performing symptom diagnosis such as failure prediction at the component/part level of the valve V (target device) based on the monitored and grasped state of the valve, optional functions such as the power saving function and data calibration function using an auxiliary sensor (such as an acceleration sensor), or a function to be executed by a predetermined application externally obtained.

These various functions may be executed in the sensor unit 1 or in an external server or the like, and are appropriately allocated as needed. When angle data can be additionally calculated based on the angular velocity data, it is preferred, in view of data accuracy, power consumption, and load, to use an acceleration sensor as appropriate for correction of drift of the gyroscope 8 and, in addition, to perform summation calculation (such as the rectangular method) by the four fundamental operations without using integrating means. When the external server 45 executes the above-described functions, a predetermined database to be used in analyzing data from the sensor unit 1 may be constructed in an external server or the like.

When an explosionproof structure is required in the attachment of the sensor unit 1, the sensor unit may be configured as not a single body, but a plurality of separate bodies. For example, the sensor unit may be configured in such a manner that, of the constituent elements of the sensor unit, only sensors including the gyroscope are attached to the control shaft of the actuator or the control shaft of the valve, the other components including the CPU are built in another unit case and disposed in an area separate from the valve, and the unit case and the sensors are connected to each other through a communication cable.

FIG. 2(*b*) depicts the pneumatic rotary actuator 7 having a double-acting type scotch yoke structure and the quarter-turn type ball valve V as examples of a target product to be monitored by the above-described sensor unit 1.

A conversion mechanism (not depicted) that converts a reciprocating motion into a rotational motion is provided inside the main body of the actuator 7. The rotary force of the conversion mechanism can be output to the stem (not depicted) of the ball valve V through the output shaft. The conversion mechanism has a structure in which a scotch yoke for transmission to a rotating shaft (valve stem) and a pair of pin rollers with which the scotch yoke is engaged are provided on a piston rod, and these are built in a housing 21.

The rotating shaft of the present example includes the output shaft on the ball valve V side (the lower side in FIG. 2(b)) and the control shaft 18 on the opposite side thereof (the upper side in FIG. 2(b)). The output shaft and the control shaft 18 are both attached to the housing 21 through tubular members. In each of the tubular members (not depicted), a predetermined bearing is press-fitted inside a shaft bearing made of metal (not depicted). The tubular members are press-fitted into bearing parts formed in the housing 21, and the output shaft and the control shaft 18 are inserted inside thereof so that the rotating shaft is rotatably attached to the main body of the actuator 7.

The actuator 7 may be provided with a pressure sensor (not depicted) as appropriate in accordance with implementation. In this case, for example, a speed controller (not depicted) is provided on each of air intake/exhaust ports 38 and 39, and a pressure sensor is connected between these air intake/exhaust ports 38 and 39 and the speed controller through a coupling such as a tees pipe or a nipple pipe. This enables pressure measurement with a simple structure using the pressure sensor without any adverse effect on intake and exhaust of compressed air by attaching the pressure sensor to a branch portion of the tees pipe.

The state grasping target of the system of the present invention is a valve and, in the present example, a rotary valve that opens and closes a flow channel by rotating the valve stem. The valve stem includes the output shaft and the control shaft 18 of an automatic valve operated through the actuator 7. However, the target valve stem is not limited to the stem of the automatic valve and, although not depicted, may be a rotating shaft consisting of the stem of a manual valve operated through a manual handle. Also, while the rotary valve of the present example is the quarter-turn type ball valve, the target rotary valve may be any other various rotary valves including electric valves such as a plug valve, a butterfly valve, and a 180-degree rotation type ball valve.

FIGS. 17 to 21 are X-X sectional views taken along the axes of flow channels 26a and 27a of the ball valve V of FIG. 2(b). The ball valve V is a floating type ball valve. A valve box includes a body 26 having the primary flow channel 26a and a body cap 27 having the secondary flow channel 27a . which are fixed to each other with bolts/nuts 28. The body 26 and the body cap 27 have flanges at the joint between the flow channels 26a and 27a.

A ball 30, which is a valve disk, depicted in FIGS. 17 to 21 is a full bore type ball having a substantially spherical portion and a through channel 30a having the same diameter as the flow channels 26a and 27a . The ball 30 is supported by two annular ball seats A1 and A2, which are valve seats, from the primary side and the secondary side inside a valve chamber. Fastening of the ball 30 by the ball seats A1 and A2 is adjusted by fastening of the bolts/nuts 28. Although not depicted, the ball 30 has an engagement portion (for example, a recessed/projecting engagement portion with width across flat) on the upper end part thereof, and the stem (valve stem) is engageable with the engagement portion. The rotational motion of the ball 30 is transmitted to the stem through the engagement par with high accuracy.

The ball seats A1 and A2 are formed of, for example, a resin material such as PTFE or PEA. The ball seats A1 and A2 become prone to wear, partial breakage, displacement, or deformation due to repetitive opening and closing operations by the actuator 7 or the like, which may cause valve seat leakage. The valve seat leakage largely affects the opening and closing of flow channels and flow rate control in the piping system. Thus, in order to prevent the valve seat leakage, it is important to grasp the conditions of the ball seats (seats) A1 and A2 such as the wear state. In the system of the present example, in addition to the state of the ball seats A1 and A2, the above-described history information unit 102 obtains, as diagnosis information, various diagnosis results such as valve box leakage, foreign matter jamming, and actuator failure, and the inference information unit 103 outputs inference information based on information of the history information unit 102 and the position information unit 101.

The applicant of the present application has confirmed that degradation in performance of the ball seats A1 and A2 in the above-described valve V caused by wear, partial breakage, or other causes is largely related to changes in the angular velocity relative to the valve opening degree over time, and thus grasps the state of the valve mainly by measuring, diagnosing, and inferring changes in the angular velocity relative to the valve opening degree over time. In this case, it is preferred that the above-described sensor unit 1 (gyroscope 8) acquire angular velocity data of the valve V.

In FIG. 2(b), a rotary encoder 22 indicated by dotted lines is attached in advance to the target product to acquire necessary data for use in the present invention before state monitoring is performed by the system of the present invention. The encoder 22 in FIG. 2(b) is connected to the upper part end of the control shaft 18 through the titling 19 having a substantially C shape and accurately measures at least the rotation angle of the control shaft 18, and the measured data is held as appropriate as unique data of the target product. in the present example, "E6C3-C", which is a product manufactured by OMRON Corporation, is used.

The above-described sensor unit 1 can be appropriately attached to a location on the above-described target product (the valve or the actuator) where the sensor unit 1 is easy to attach. For example, the sensor unit 1 is attached to a location where the sensor unit 1 can be left for a long period of time without interfering the operation of the target product. Although the attachment mode of the sensor unit 1 is not limited to the attachment mode depicted in FIG. 2(b), the sensor unit 1 at least needs to be attached so as to accurately rotate together with the rotation of the control shaft 18 (valve stem).

When the sensor unit 1 is fixed in the mode depicted in FIG. 2(b), the sensor unit 1 can be fixed merely by aligning a bolt hole of the fitting 19 with the female threaded portion provided on the upper end of the control shaft 18 in accordance with the NAMUR standard and screwing the bolt 19a with the fitting 19 facing an appropriate fixing direction. Thus, the sensor unit 1 of the present invention can be easily retrofitted to the target product at a predetermined position without detaching the existing actuator 7 or the valve V, which are already installed, from the piping facility or detaching the actuator 7 from the valve V, and also without performing any adjustment with existing instrument systems, and can accurately grasp the rotational motion characteristic of the control shaft 18 after attached in this manner.

The above-described attachment mode reduces outward projection to prevent expansion of an installation space. Thus, the sensor unit 1 can also be attached to an automatic valve installed in a confined space. The sensor unit 1 can also be placed at a position shifted by 180° relative to the actuator 7 and, also in this case, can be attached and detached merely by attachment and detachment of the bolt 19a in a manner similar to the above. Accordingly, the sensor unit 1 can be provided at any of sides opposing by 180° in accordance with the installation condition of the valve V and the actuator 7.

Furthermore, not only when the valve V is in a fully-closed state, but also when the valve V is at an opening degree in the middle and the control shaft 18 is in the middle of rotation, the sensor unit 1 is attached to the control shaft 18 while being positioned as appropriate. Thus, accurate attachment can be performed to enable initial setting work even while the automatic valve is in operation.

After the attachment of the sensor unit 1, the operating condition of the valve V at each site can be visually recognized by using the display device 2. At this time, since the communication module 14 such as Bluetooth (registered trademark), Wifi, or LoRa is used, even when the valve V and the actuator 7 are installed in a complex pipeline or a confined place, these can be checked using the display device 2 from a remote location without direct visual recomition.

Note that while the above embodiment describes an example in which a pneumatic actuator is used as an actuator for automatic operation, an actuator other than the pneumatic actuator, such as a fluid pressure actuator or an electric actuator, may be used. The outer shapes of the fitting 19 and the case of the sensor unit 1 can be changed in accordance with the sizes of the valve V and the actuator 7. Furthermore, while the control shaft 18 is provided in accordance with the NAMUR standard in the above embodiment, the control shaft 18 may be provided in accordance with other standards. Also in this case, formation is made in accordance with the shape, thereby enabling easy retrofitting to the actuator, as with the case of the NAMUR standard.

[Operation of Portable Terminal]

The system of the present invention also includes a display system, The display system displays a predetermined screen on the display unit 3 of the display device 2 (terminal device). In the present example, an application that displays a screen example on the display unit 3 and implements an input/output process is built in the display device 2. Alternatively, for example, a display application may he appropriately acquired from an application server provided in the server 45 described further below and the display application may be used to constitute the display system.

Figure 5:
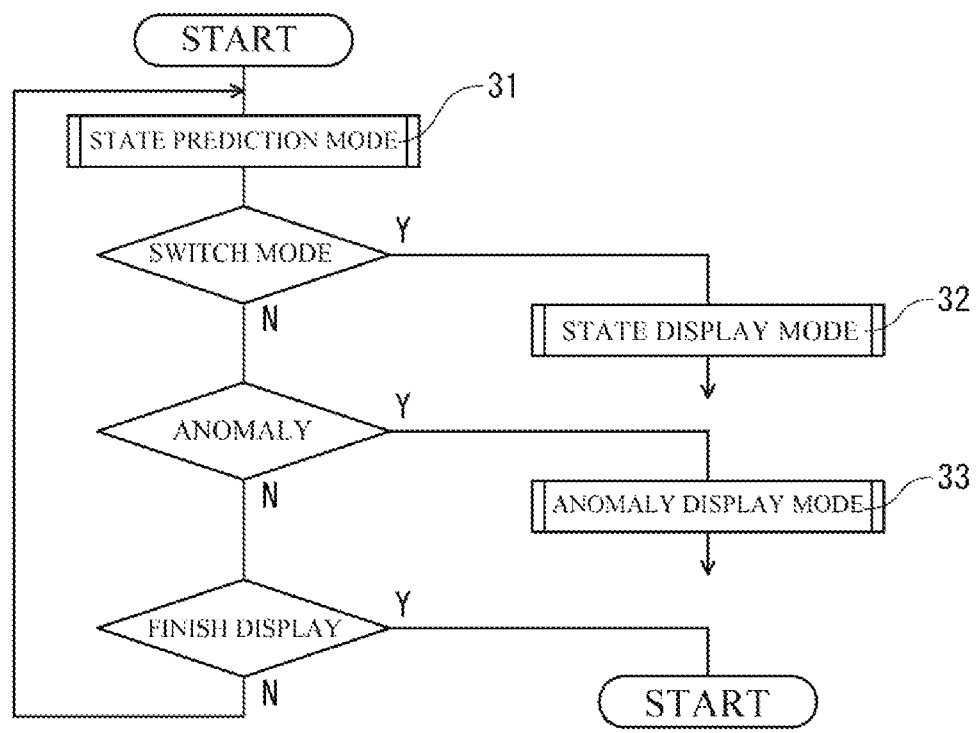
FIG. 5 is a flowchart depicting an example of the operation of the display device of the present invention.

FIG. 5 is a flowchart schematically depicting a process corresponding to an example of the operation of the display device 2 in the present embodiment.

Hereinbelow, an example of screen display when the display application is started in the display device 2 will be described with reference to FIGS. 6 and 7. The screen display of the display device 2 is mainly based on data of the database 4 of the system acquired via the communication unit 11.

First, a home screen (not depicted) is displayed on the display unit 3 in accordance with an instruction from the CPU 9 depicted in FIG. 4. This home screen may, for example, display domestic factories of a specific company in Japan on a map of Japan as background and display the domestic factories in a form that allows a bird's-eye view at sight. Also, for example, the home screen may display in percentage, for the whole country or a specific factory as a target area, the number of sensor units 1 in normal operation (for example, a state in which no anomaly is diagnosed as will be described further below) relative to the number of all sensor units 1 installed within the target area (100%). It is highly convenient to display the percentage of normally operating sensor units 1 on the home screen all the time in this manner because the stale of the valves with the sensor units 1 attached thereto (the state of the pipe lines) can be easily checked at a glance as a whole basically merely by visually checking only the home screen.

Next, the CPU 9 determines whether one area has been selected by, for example, a touch operation of a user on the home screen. When it is determined that one area has been selected, the CPU 9 makes a transition from the home screen to a screen associated with the one area. For example, when an operation of selecting a selective area represented by a predetermined icon or the like that represents a specific factory on the home screen is performed, a transition to a screen (valve list display screen) displaying a list of valves disposed on the pipe in this factory (not depicted) may be made.

In this case, the display device 2 is capable of executing processes of a state prediction mode 31, a state display mode 32, and an anomaly display mode 33.

In FIG. 5, the state prediction mode 31 is a process of executing various processes required to predict the state of the monitoring target valve with the sensor unit 1 attached thereto and, for example, displayed on the display unit 3 as a state prediction screen that can be reached from the home screen through a predetermined screen transition. FIG. 6 schematically depicts display information of the state prediction screen. Any display form including the arrangement, size, and design of each piece of display information and font and coloring of each character is selected as appropriate in accordance with implementation. The same applies to FIG. 7. The state prediction mode 31 also includes various processes required to acquire various types of information displayed on the state prediction screen.

In FIG. 5, mode switching determines whether to switch the state prediction mode 31 to the state display mode 32. The state display mode 32 is, for example, a process of performing various processes required to display real-time status information of the valve such as an angular velocity graph obtained from the opening and closing operation of the valve. The state display mode 32 may be configured in such a. manner that a transition to a display screen (not depicted) corresponding to this mode can be made, for example, by selecting a predetermined selective area on the state prediction screen example depicted in FIG. 6.

In FIG. 5, when display that makes a notification of a predetermined anomaly is recognized on the state prediction mode 31 (state prediction screen), a process required for the anomaly display mode 33 is executed by selection of a predetermined selective area by a user.

The anomaly display mode 33 executes various processes required to display various types of information about an anomaly of the monitoring target valve with the sensor unit 1 attached thereto. FIG. 7 described further below schematically depicts an example of an anomaly display screen displayed in the anomaly display mode 33. The anomaly display mode 33 includes various processes required to obtain various types of information displayed on the anomaly display screen. When no anomaly is detected, the display can he finished by a user performing an operation of selecting a predetermined selective area on the screen.

FIG. 6 is an example of a screen that displays information about state prediction of the monitoring target valve. On the upper part of the screen in FIG. 6, specific information display areas 34 to 37 for the valve with the sensor unit 1 attached thereto are displayed.

For example, in the specific information display area 34, the name of the company that owns the valve with the sensor unit 1 attached thereto, the factory's name, and the pipe line name (line name) are simply displayed in the largest font on the screen while preventing information overload. In the area 34, a brief text describing the state of the screen display (such as "valve unique information is on display" or "graph can be switched") may be displayed.

In the specific information display area 35, information about the location of the factory is displayed. For example, an actual photographic image of the factory may be displayed in the area 35, and a plurality of photographic images of the factory may be displayed so as to be switchable by touch operation. Furthermore, in the specific information display area 36, information about the valve to which the sensor unit 1 is to be attached is displayed. For example, a plurality of actual photographic images of the valve may be switchably displayed or unique information of the valve may be displayed in a predetermined form.

In the specific information display area 37, the serial number (valve number) for identifying the valve with the sensor unit 1 attached thereto in the factory, the remaining battery power of the sensor unit 1, the communication state of the sensor unit 1, and the like are displayed. Also, selection buttons for transition to screens (not depicted) that display history information including records of valve maintenance work or the like, valve catalog, delivery drawings, and an instruction manual may be displayed.

In this manner, in order to view the monitoring status of a plurality of valves inside the piping system, three pieces of information including the location of the piping system of the factory or the like, the external appearance of monitoring target valves in the location, and maintenance records of the valves are displayed, for example, from general information to detailed information from left to right, which makes the state of the valves easier to understand and is preferred as a man-machine interface.

In FIG. 6, angular velocity graph information obtained from the valve with the sensor unit 1 attached thereto is displayed as a graph at the bottom of the screen. In the graph, the left axis represents torque (N·m) of rotation and corresponds to the bar graph, the horizontal axis represents time (by year), and the right axis represents an opening/closing time (second) and corresponds to the line graph.

Here, the horizontal axis represents the time spanning from the past to the present and further into the future. For example, if the present is 2019 AD, the graph shows the time from 2017 AD (past) to 2019 AD (present), and further to 2020 (future).

In response to this, the line graph (opening/closing time) is extended to the future. The opening/closing time indicated by the extended portion is a predicted opening/closing time obtained by applying predetermined state prediction means to the opening/closing time obtained from the valve with the sensor unit 1 attached thereto in the system control unit 100.

For example, extrapolation is used as the state prediction means. In this graph, known extrapolation is applied to the graph (line graph) of the opening/closing time to extend the graph, and a predicted range predicted in the extended portion (the portion corresponding to the time from the present to the future) is indicated by a dotted line or the like. Furthermore, an explanation for the graph may be displayed in an area 40. Note that, as the state prediction means, CNN mean described further below may be used for calculation.

A button group 41 to be displayed includes selection buttons for changing the display form of the graph displayed on the bottom (a plurality of buttons for the respective display forms) (not depicted) and a button for selecting display of predetermined animation that operates in accordance with the graph.

FIG. 7 is an example of a screen that displays information about an anomalous state of the valve with the sensor unit 1 attached thereto. The same parts as those in FIG. 6 are denoted by the same reference signs to omit redundant description. For example, FIG. 7 can be displayed by transitioning the graph part on the bottom of FIG. 6 described above by a swiping or flicking operation. Also, since FIG. 7 is the screen that makes a notification of an anomalous state, for example, anomaly display may be performed in a predetermined eye-catching form on the bottom of the screen of FIG. 6 to make a notification of the anomaly in advance. For example, when the base color of the screen is blue, large text such as "there is an anomaly in angular velocity during opening to closing" displayed in conspicuous red is easy to understand.

In FIG. 7, output results of inference information described further below are displayed in anomaly display areas 42 to 44. In the anomaly display area 42, information about diagnosis inference information described further below is displayed. In this case, the information is preferably displayed for each diagnosis result together with the probability as each result, and it is more preferred that the diagnosis results be color-coded according to the magnitude of the probability and displayed in the form of a predetermined pie chart because of its easiness to understand. Furthermore, in the anomaly display area 43, the basis of determining the diagnosis inference information output in the anomaly display area 42 is displayed in a predetermined form.

For example, in the anomaly display area 43, display such as "Cause diagnosis basis: (1) Anomalous opening/closing, speed, (2) Anomalous speed at an opening degree of around 82 to 88 degrees" or "Valve state diagnosis: In the case of foreign matter jamming, there is a possibility of seat leakage caused by seat damage. In the case of contact due to human operation, there is no influence on the valve. In the case of abnormal stem shape, there is stem damage caused by wear of thrust washers or packing parts" is made.

in the anomaly display area 44, predetermined remedies are displayed in response to the displayed diagnosis result. information about the remedies are, for example, held in the database 4 in advance in the form corresponding to the diagnosis results, and retrieved by the system control unit 100 and displayed as needed. For example, display such as "Remedy proposal: Perform valve opening and closing operation and check torque data, (2) If there is no change in the torque value, spare and replace, (3) If the torque value decreases, no action is needed" is made. Furthermore, a predetermined selection button or the like may be displayed for transition to a screen (not depicted) where a predetermined input operation can be performed to provide work instructions to the maintenance company.

On the bottom of the screen of FIG. 7, an angular velocity graph with the horizontal axis corresponding to one opening/closing (from 0 degree to 90 degrees) of the valve with the sensor unit 1 attached thereto is displayed. The dotted circle highlights a pattern portion of the angular velocity graph diagnosed as anomalous this time. In this manner, when an anomaly is diagnosed, an angular velocity graph corresponding to the anomaly and the portion of the pattern determined to be anomalous are displayed, which makes it easy to conjure up an image of the cause of the anomaly at a glance and is thus preferred.

As described above, in the display system of the present invention, an anomalous state of the valve can be easily grasped on the state display and the anomaly notification display that are easy to visually recognize on the state prediction screen and the anomaly display screen that can be easily transitioned from the state prediction screen. Thus, important valve status information can be displayed in a centralized manner on a portable terminal, As a result, in addition to monitoring and maintenance of valve systems, the work efficiency required to respond to anomalies can be significantly improved.

[Examples of Angular Velocity Graph (Input image)]

FIGS. 12 to 16 are examples of a graph image showing actual measurement values of the angular velocity in a 90-degree rotary floating ball valve measured by the system of the present invention. FIGS. 22 to 27 are examples of a graph image showing diagnosis on the seat in a 90-degree rotary butterfly valve. The target product of the system of the present invention is not limited to these targets, and the system can make detailed diagnosis at the level of a specific portion/specific symptom of the target product by analyzing the shape and pattern of a characteristic graph (angular velocity graphs) generated from data including angular velocity data widely collected from the target product. Particularly in the case of a valve, it is preferred to include grasping of the wear state of at least the valve seat, the gland packing, and/or the stem bearing as the target portion/component.

As depicted in FIGS. 12 to 16 and FIGS. 22 to 27, which are angular velocity graphs of examples, each angular velocity graph includes at least a plurality of peak values. An opening-degree or time-evolution graph having such peak values cannot be obtained from, for example, a normal angle (position) sensor attached to a rotary valve.

Thus, in conventional techniques, a system like the present invention that makes a detailed diagnosis based on information about these peak values (such as the position, value, and peak width on the graph) cannot be constructed. According to intensive studies conducted by the applicant of the present application, it has turned out that such an angular velocity graph can be obtained at least by the gyroscope 8 as described abo ve.

At least in the case of a vibrating-type gyroscope of a MEMS-made semiconductor type, this can be considered from its measurement principle as follows. That is, a normal angle sensor can only detect a discrete angle at each duration of time. Thus, in converting angle data to an angular velocity, it is only way to calculate it as a gradient in a duration of time on a time-evolution graph. On the other hand, in the case of a gyroscope, an instantaneous Coriolis force sensed by a vibration element is converted into an angular velocity for measurement. Thus, it is possible to accurately measure a substantially actual angular velocity depending on the settings. Also, if an angle sensor is used to achieve this, it is at least necessary to set an extremely small duration of time, which is not practical.

In this respect, for smooth, glow and continuous motions, there is not so much difference between the two (angular velocity data obtained from the angle sensor and angular velocity data obtained from the gyroscope). However, for rotational motions of an object that moves while receiving fine, random, and discontinuous frictional action, for example, the valve stem of a rotary valve, there is a difference between the two. Specifically, an angular velocity graph obtained from the angle sensor cannot follow fine movements in detail. Thus, a peak-like non-curvilinear and vibratory pattern cannot be obtained. On the other hand, the gyroscope can catch fine movements of the valve stem caused by the frictional action well. Thus, it may be possible to obtain a precise angular velocity graph with peaks appearing at a plurality of points.

Furthermore, inertial sensors, which are typical internal information sensors, are typically classified into acceleration sensors and gyroscopes. In conventional techniques, there are also valve opening meters that are provided with this acceleration sensor and can be easily attached to the upper end part of the stem of the rotary valve. That is, the rotation angle or the like of the valve handle is detected through this acceleration sensor or the like. However, while at least MEMS-type acceleration sensors, which have been commonly used in recent years, are excellent in detection of a translational motion, a vibratory motion, or a tilt relative to the gravity direction in principle, there is plenty of room for improvement in detection with a simple configuration though detailed detection of a rotational motion is not impossible.

This type of acceleration sensor has a property that a motion within the horizontal plane with no tilt relative to the gravity direction is almost in a dead band and extremely difficult to detect. Furthermore, the acceleration sensor easily catches unnecessary components other than roll acceleration, such as gravitational acceleration components and translational (vibrational) acceleration components. In addition, it is theoretically known that it is impossible to appropriately separate the measured unnecessary acceleration from an output signal at least by using only one acceleration sensor. In practice, this type of valve opening meter has restrictions on the piping orientation and direction of an attachment target and is often used after the piping orientation of a valve to be the attachment target is checked in advance and the sensor configuration is adjusted for use appropriate for the target. Thus, it is also difficult to catch in detail a rotational motion rotating while receiving random friction at least with a simple structure including only an acceleration sensor.

FIGS. 12 to 16 depict data of experiments performed under the conditions: driving time: 4 (seconds; 90 degrees); attachment orientation: horizontal; actuator supply pressure: 0.5; fluid: steam; fluid pressure: 1 (MPa); piping support: 100; and ambient temperature: 25° C. (note that a valve with a nominal pressure of 10 K was used). The test conditions are examples of conditions of test products required at minimum in view of quality engineering in testing the system of the present invention. The structure unique to the target product (ball valve V) with the sensor unit 1 attached thereto is associated with the positions, sizes and peak widths of a plurality of peaks that appear in angular velocity data graphed as appropriate to precisely grasp the state of the target product and perform a precise diagnosis on the target product based on the grasped details.

FIGS. 12 to 16 are examples of an angular velocity graph obtained from the gyroscope 8 by using the sensor unit 1 of the present invention when the ball 30 rotates by 90 degrees from a fully-closed state to a fully-open state in the quarter-turn actuator 7 and the floating ball valve V depicted in FIG. 2(*b*), and the right vertical axis represents the angular velocity (unit: degree/second), Also, measurement values of this angular velocity indicate measurement values in the Y-axis direction for the gyroscope 8 depicted in FIG. 2(*a*). Note that while, in the present example, measurement values in the X-axis direction and the Z-axis direction are not used as graph data, these values may be used as complementary data for the purpose of correcting errors in the attachment of the gyroscope.

The horizontal axis in each of the drawings represents a valve operating time, which is the time after air pressure is supplied to the actuator 7 through the speed controller (unit: millisecond). Specifically, the valve is a stainless steel ball valve having a nominal diameter of 50 A and a nominal pressure of 20 K. Diagnosis targets are the ball seats A1 and A2 made of PTFE +PEA, Although not depicted, a stem bearing made of PTFE containing glass fiber and a V packing made of PTFE may also be the monitoring targes (the ball seat A, the stem bearing, and the gland packing are collectively referred to as "wear components"). Also, as indicated by an opening/closing count in the drawings, FIGS. 12, 13, 14, 15, and 16 are data acquired after the valve is opened and closed 0, 30, 500, 1000, and 10000 times, respectively.

Furthermore, in the present examples, the encoder 22 as depicted in FIG. 2(b) is attached to the control shaft 18 together with the sensor unit 1, and angle data obtained by the encoder 22 is also indicated as valve opening degree on the left vertical axis in FIGS. 12 to 16 (unit: degree).

Figure 17:
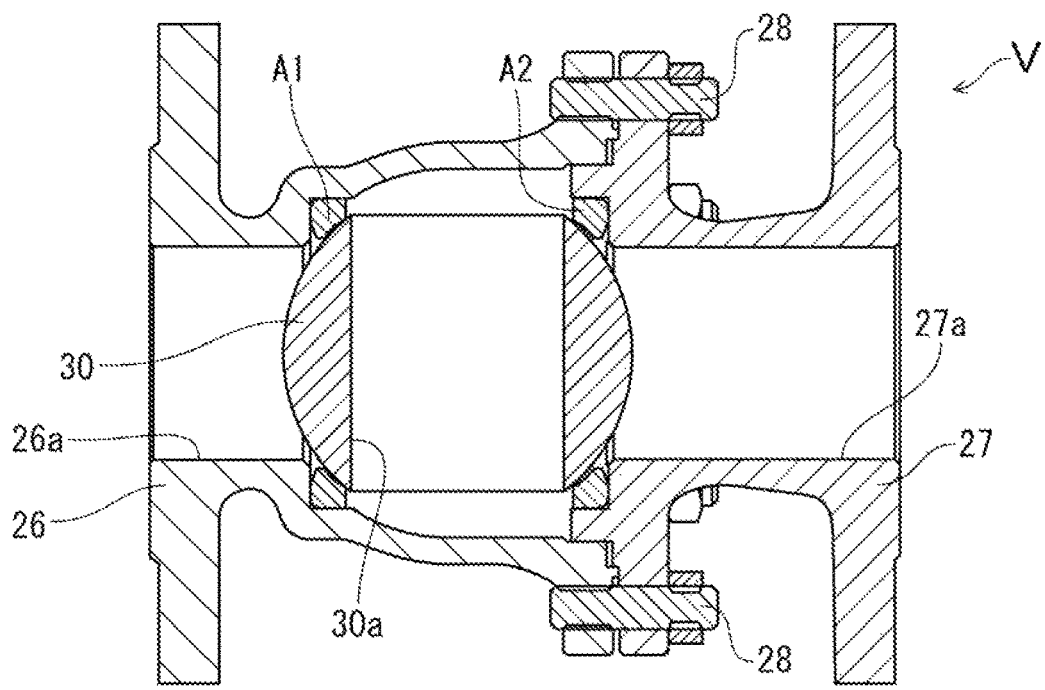
FIG. 17 is a sectional view taken along line X-X, depicting an example of the ball valve in a fully-closed state.
Figure 18:
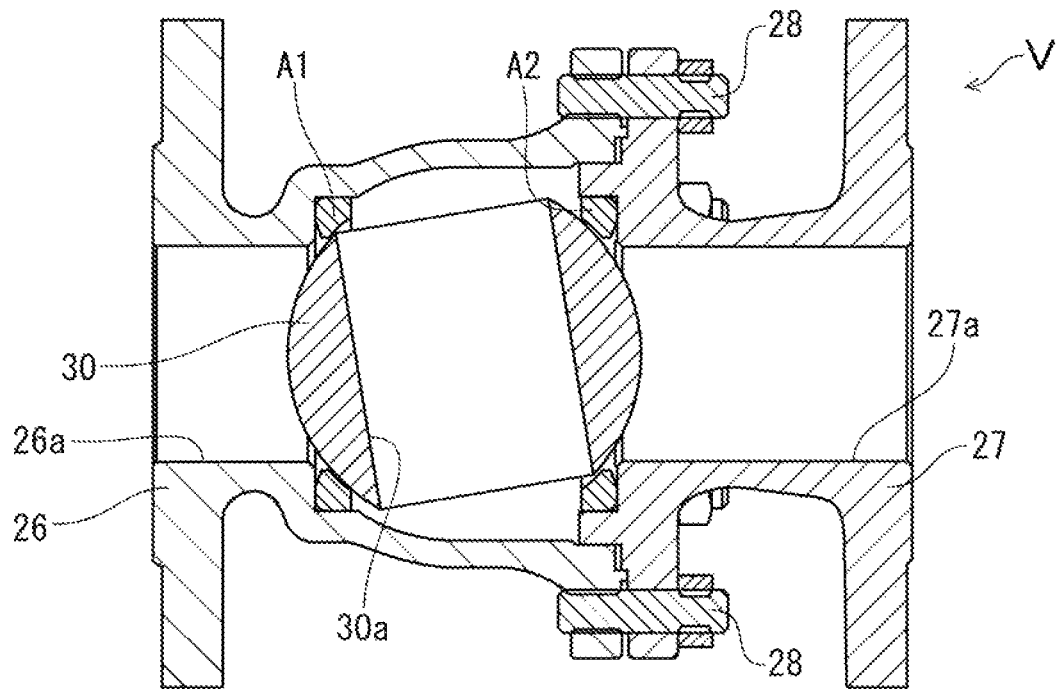
FIG. 18 is a sectional view taken along line X-X, depicting an example of t ball valve at an opening degree in the middle.
Figure 19:
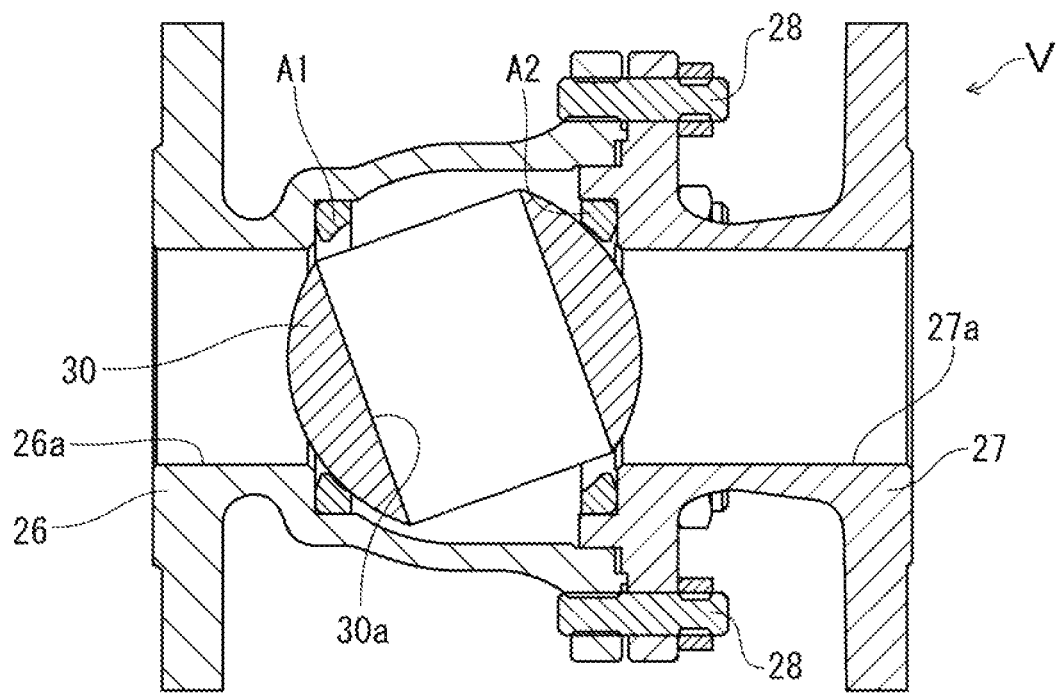
FIG. 19 is a sectional view taken along line X-X, depicting an example of the ball valve at an opening degree in the middle.
Figure 20:
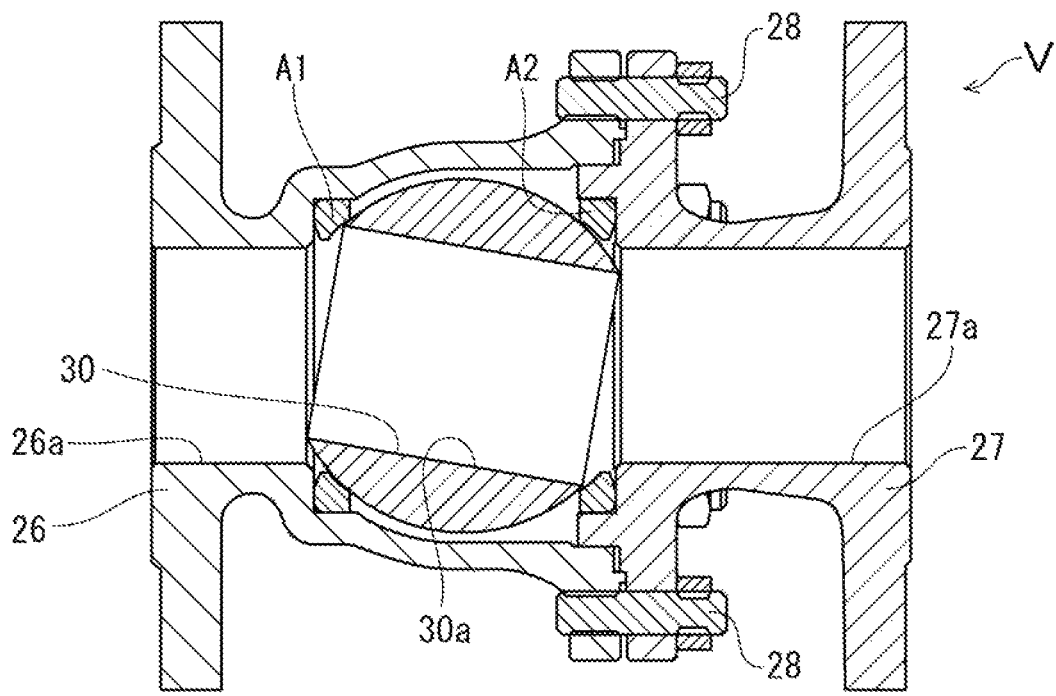
FIG. 20 is a sectional view taken along line X-X, depicting an example of the ball valve at an opening degree in the middle.
Figure 21:
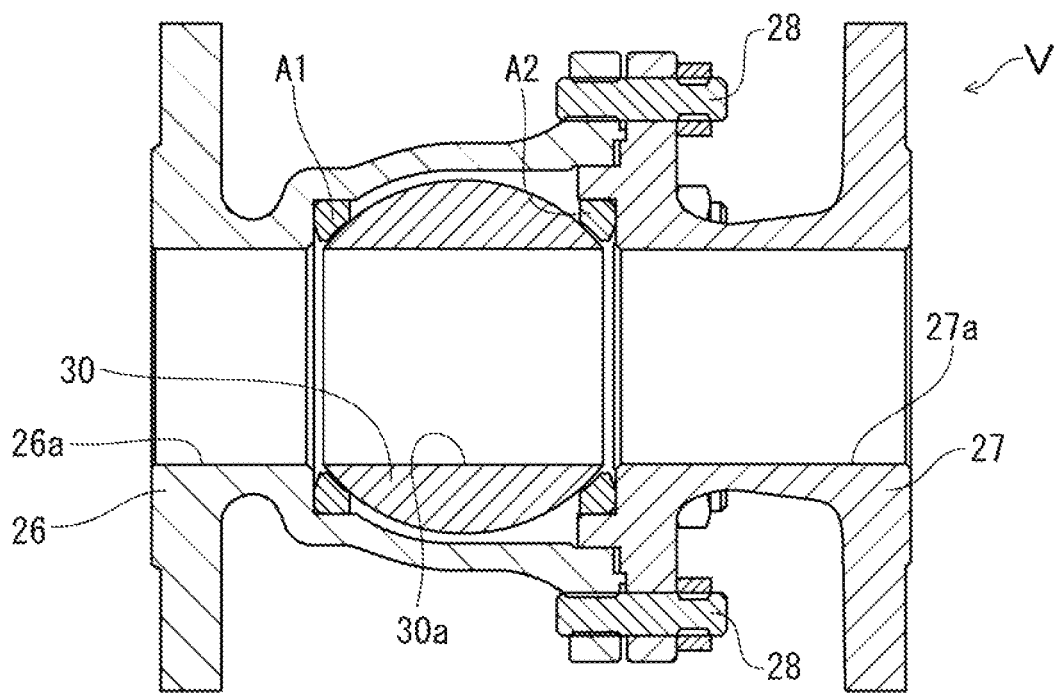
FIG. 21 is a sectional view taken along line X-X, depicting an example of the ball valve in a fully-open state.

FIGS. 17 to 21 schematically depict the valve depicted in FIGS. 12 to 16 from a fully-closed state to a fully-open state in the order of the figure number and, specifically, are explanatory diagrams for the positional relationship between the through channel 30a of the ball 30 and the ball seats M and A2, and the like. FIG. 17 depicts the valve at an opening degree of 0 (fully closed), FIG. 18 depicts the valve at an opening degree of approximately 10 degrees, FIG. 19 depicts the valve at an opening degree of approximately 20 degrees. FIG. 20 depicts the valve at an opening degree of approximately 80 degrees, and FIG. 21 depicts the valve at an opening degree of approximately 90 degrees (fully open).

Furthermore, assuming that a contact rate between the ball 30 and the ball seat A is 100% in the state depicted in FIG. 17, the contact rate is still 100% in FIG. 18, decreases to 85% in FIG. 19, further decreases to 62% in FIG. 20, and again returns to 100% in FIG. 21.

Figure 22:
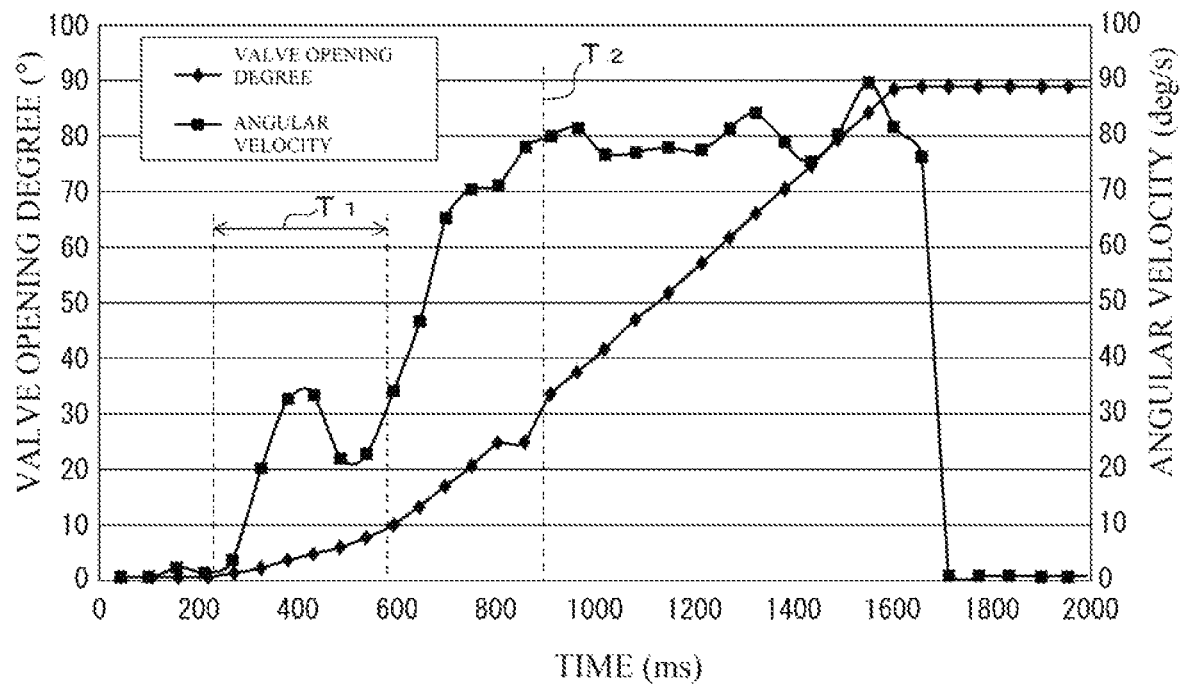
FIG. 22 is an example of an angular velocity graph obtained in a butterfly valve under specific conditions.
Figure 23:
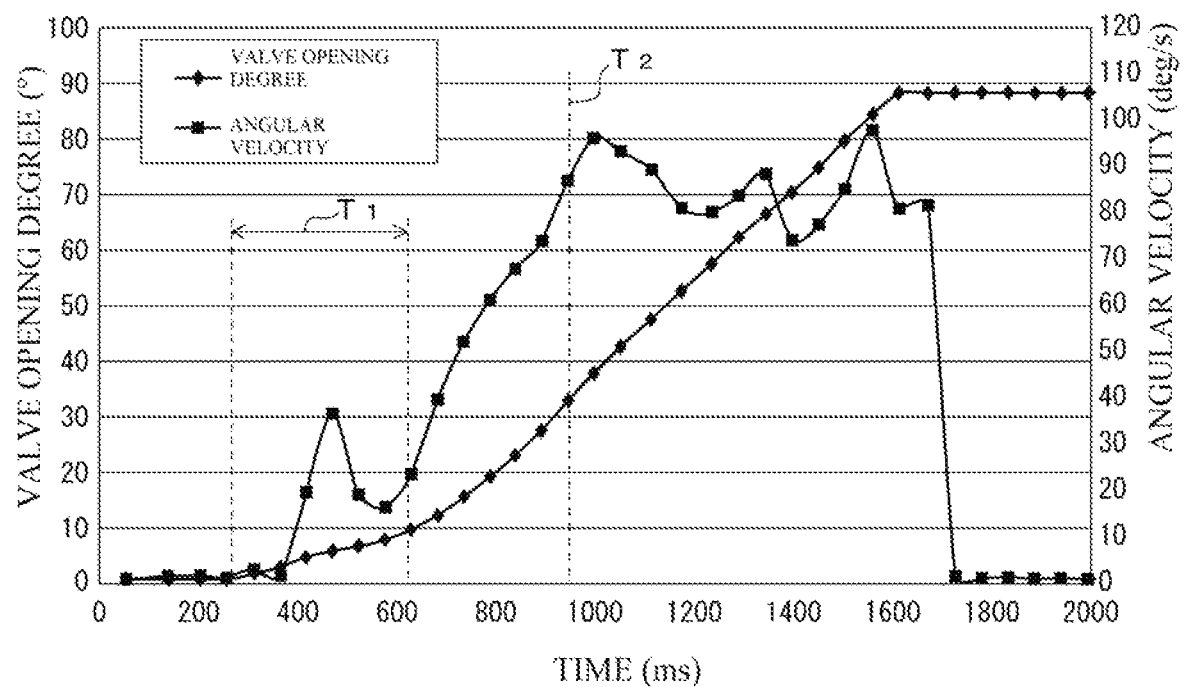
FIG. 23 is an example of the angular velocity graph obtained in a butterfly valve under specific conditions.
Figure 24:
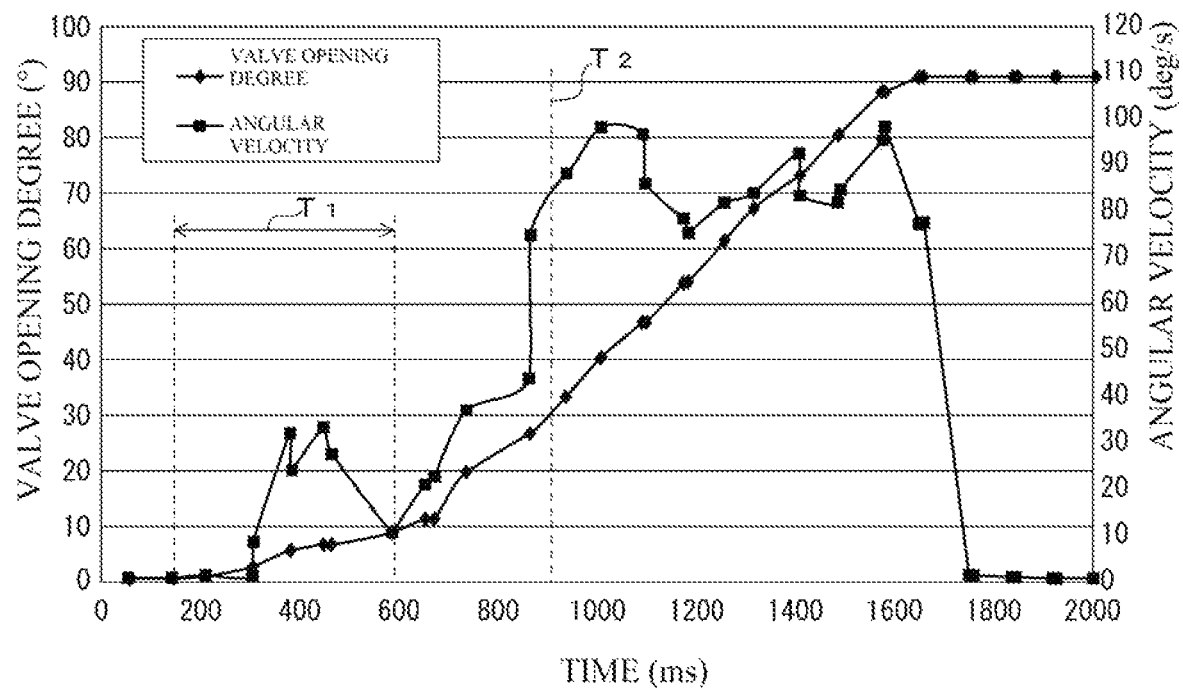
FIG. 24 is an example of the angular velocity graph obtained in a butterfly valve under specific conditions.

Next, although no structural diagram is depicted, FIGS. 22 to 24 are examples of an angular velocity graph obtained from the gyroscope 8 by using the sensor unit 1 of the present invention when the valve disk rotates by 90 degrees from a fully-closed state to a fully-open state in a double-acting pneumatic actuator having a rack-and-pinion structure and a quarter-turn type butterfly valve. Details of the graphs are similar to the above, and the graphs show data of experiments performed under the test conditions: driving time: 2 (seconds/90 degrees); attachment orientation: horizontal; actuator supply pressure: 0.2; fluid: cold water; fluid pressure: 0.1 (MPa); piping support: 10; and ambient temperature: 0° C.

Specifically, the butterfly valve has a center-type butterfly valve structure made by aluminum die-casting and having a nominal pressure of 10 K and a nominal diameter of 50 A, and the sensor unit 1 of the present invention is attached to its valve stem in a manner similar to the mode described above. As with the graphs described above, the graphs of these drawings also show angles measured by the encoder and angular velocities obtained by the gyroscope 8 built in the monitoring unit (Y-axis measurement values) in a graph form. The diagnosis target is a rubber seat made of EPDM. Also, FIGS. 22, 23, and 24 are data acquired after the valve is opened and closed 0, 500, and 1500 times, respectively.

As with FIGS. 22 to 24, FIGS. 25 to 27 are also examples of an angular velocity graph obtained by the gyroscope measuring operations from a fully-closed state to a fully-open state in a quarter-turn butterfly valve equipped with a pneumatic actuator. In each of the fully closed to fully open operations in FIGS. 25 to 27, a prescribed valve seat inspection was performed on the valve in a fully-closed state, and it was confirmed that there was no leakage.

Figure 25:
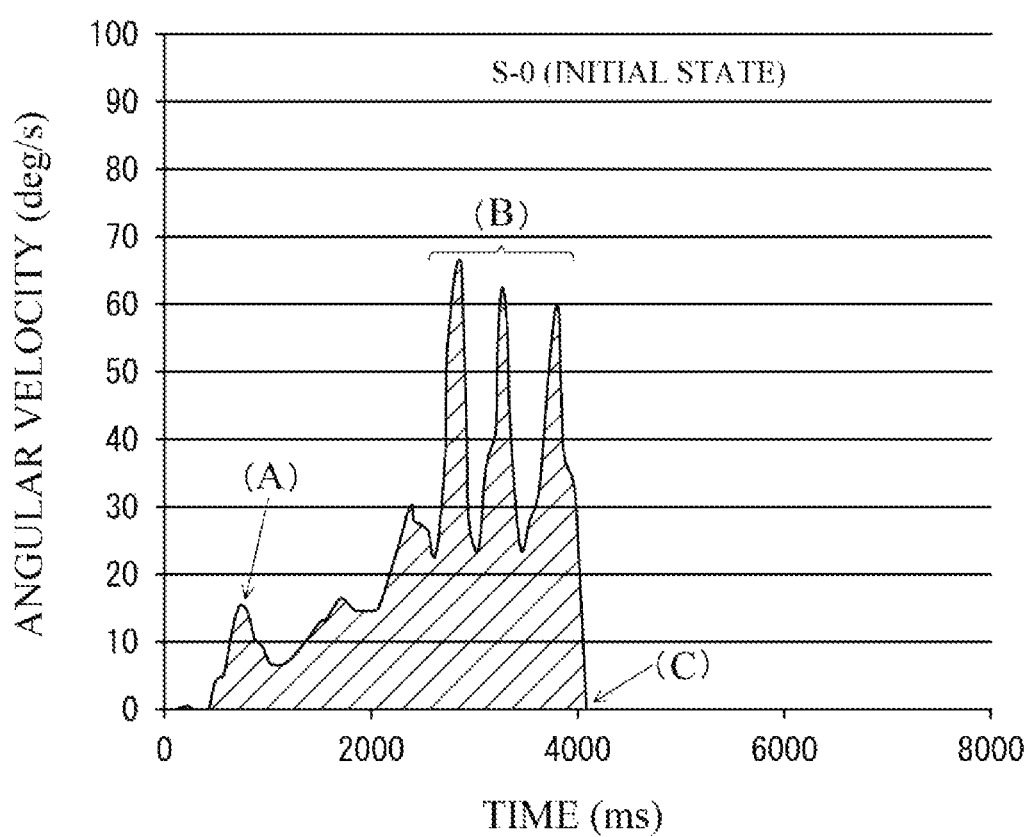
FIG. 25 is an example of the angular velocity graph obtained in a butterfly valve under specific conditions.

FIG. 25 is a graph in an initial state in which the opening/closing count is zero. In the part (A) in the graph of FIG. 25, a small peak of the angular velocity appears immediately after the start of the operation of the valve disk. This peak is presumed to have been caused by a so-called jumping phenomenon in which the valve blade part moves away from the rubber seat somewhat suddenly as the valve disk rotates in the valve opening operation. In this drawing, in the part (B) in the graph, three peaks appear at a position where the valve disk is close to fully open. These peaks are presumed to have appeared in response to the shape of the rubber seat of the valve disk of the butterfly valve. In FIG. 25, the part (C) in the graph corresponds to a position where the valve disk becomes fully open. It is shown that this valve takes approximately 4100 (ms) from a fully-closed state to a fully-open state.

Figure 26:
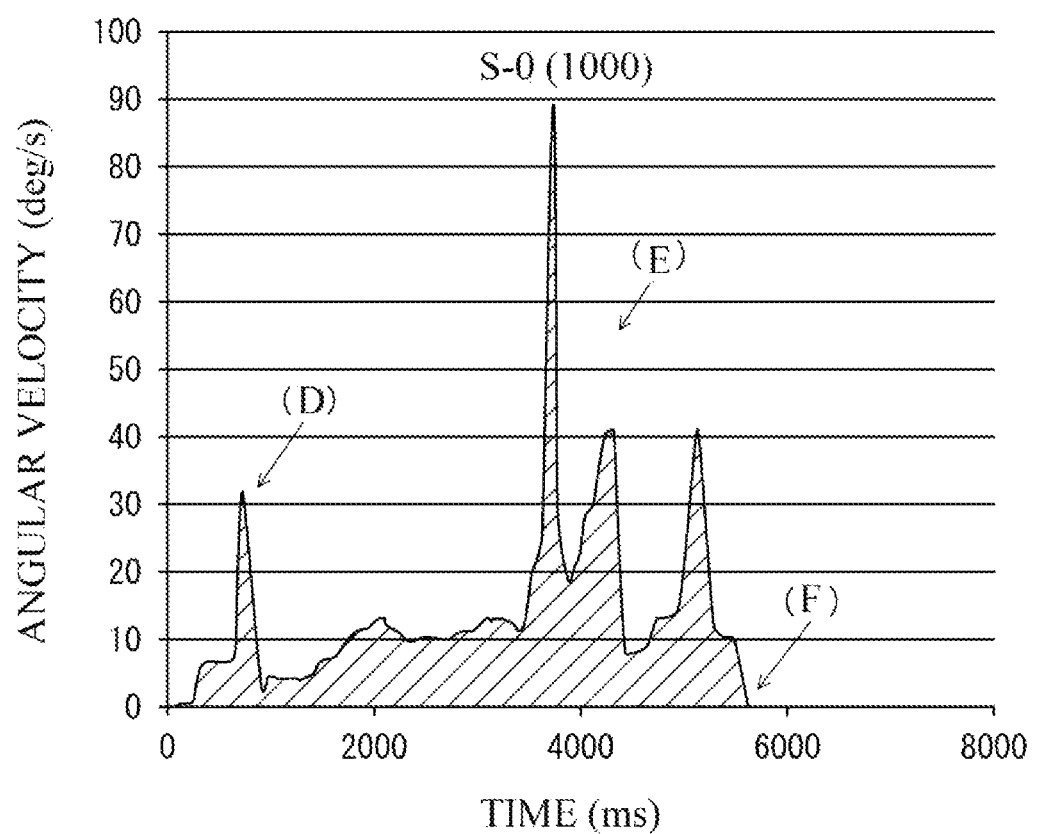
FIG. 26 is an example of the angular velocity graph obtained in a butterfly valve under specific conditions.

FIG. 26 is a graph of the angular velocity measured at an opening/closing count of 1000 times. The part (D) in the graph of this drawing indicates a peak immediately after the start of the operation, but the position (time) where this peak appears is approximately twice that in FIG. 25. If this peak is caused by the jumping phenomenon of the valve disk as described above, it can be presumed that, for example, wear of the rubber seat is in progress by detecting such a shift in the peak. That is, as one mode of butterfly valve maintenance, the timing of maintenance of the joint can be inferred. For example, the peak may be se as a feature value in advance, and, when the feature value exceeds a specific threshold, a notification of maintenance of the stem joint of the butterfly valve may be made.

In FIG. 26, the part (F) in the graph can be regarded as a changed pattern of the three peaks in the part (B) of FIG. 25 described above. In this case, the change in the three peaks can be regarded as representing a change in the shape of the rubber seat. Thus, this can be used for notification of maintenance of the rubber seat of the butterfly valve. Also, in this drawing, the time required to fully open the valve can be grasped from the part (F) in the graph. In this case, the time is approximately 5600 (ms), which is longer than the time indicated in the part (C) of FIG. 25 as the first time. Furthermore, although not depicted, the operating torque at 1000 times (FIG. 26) is larger than the operating torque at the first time (FIG. 25).

Figure 27:
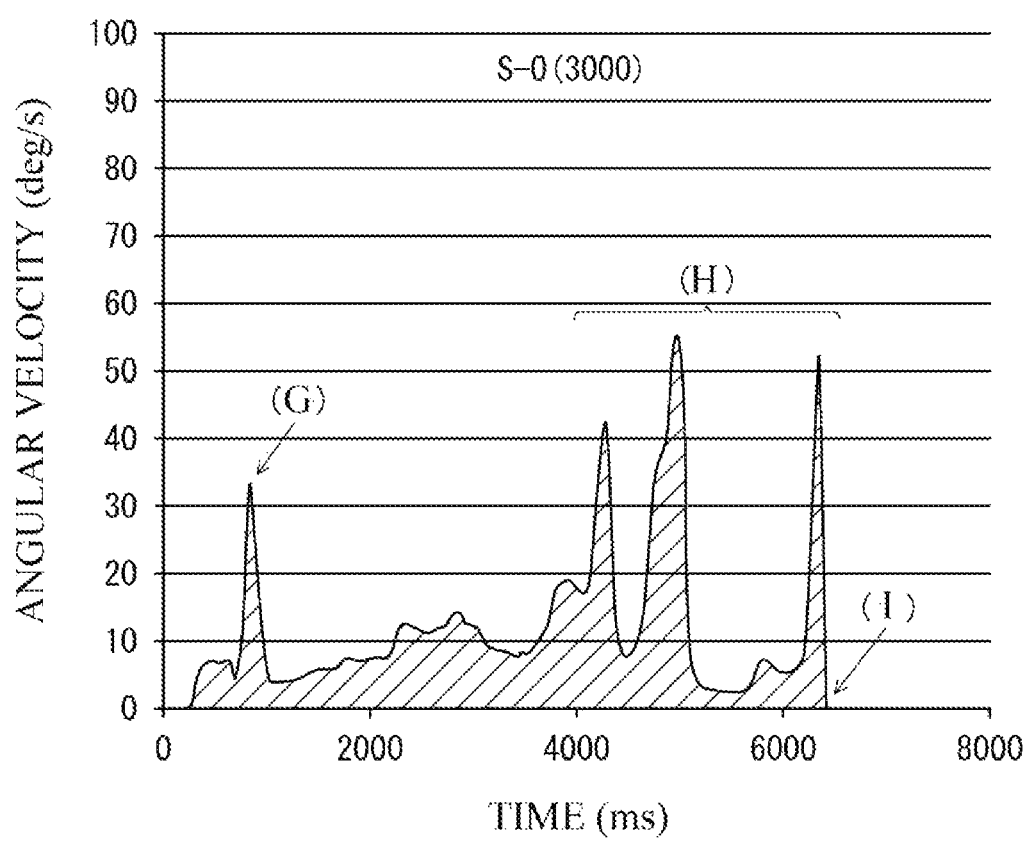
FIG. 27 is an example of the angular velocity graph obtained in a butterfly valve under specific conditions.

FIG. 27 is a graph of the angular velocity measured at an opening/closing count of 3000 times. For a peak immediately after the start of the operation in the part (G) of this drawing, there is no particular change at least relative to the part (D) of FIG. 26. Three peaks appear in the part (H) in the graph of this drawing as with the part (B) of FIG. 25 and the part (F) of FIG. 26. However, these peak values are different from the peak values in the part (B) of FIG. 25 and the part (F) of FIG. 26, and the interval between the peaks are also different from that in the part (B) of FIG. 25 and the part (F) of FIG. 26. Such changes can be regarded as representing the wear state of the rubber seat. That is, if there are large changes in the peak values and the peak interval to this degree, it can be considered that a change in the shape of the rubber seat is also large. Thus, this can be used to know the timing of maintenance of the rubber seat.

In FIG. 27, the time required to fully close the valve from its fully-open state indicated by the part (I) in the graph is approximately 6400 (ms). That is, the time is approximately 1.6 times that in the part (F) of FIG. 26. For example, an increase in the frictional force of the rubber seat or degradation in the performance of the actuator can be inferred also from this increase in the opening/closing time, and this can be used for estimation of the timing of maintenance of the valve.

Information about the peaks such as (A) and (B) of FIG. 25, (D) and (E) of FIG. 26, and (G) and (H) of FIG. 27 are regarded, for example, as described above based on changes in the information such as these peak values, the time when each peak appears, or the time required to fully open the valve such as (C) of FIG. 25, (F) of FIG. 26, and (I) of FIG. 27, which enables prediction of the timing of maintenance of the valve. Accordingly, it is possible to efficiently perform valve maintenance while preventing unexpected failures or stoppage in the pipe line.

Furthermore, according to the present invention, it is also possible to perform failure and state grasping and failure prediction in addition to inference of the state of the valve by a technique as described below using such two-dimensional angular velocity graph images. Specifically, as indicated by hatched regions (areas) of FIGS. 25 to 27, the angular velocity graph is recognized as an image and subjected to machine learning, which can be used to predict valve failures based on changes in the valve state, For example, comparing FIG. 25 with FIG. 26, the hatched region in FIG. 26 changes from the hatched region in FIG. 25 in such a manner as to horizontally extend.

In this manner, by not only comparing peak values of the angular velocity or the time indicated by peak values or making pass/fail determination based on the threshold, but also using images, it is possible to check the condition of the system including the state of the seat (ball or rubber seat), such as wear or partial breakage, based on overall tendencies without being influenced by momentary value changes, thereby enabling appropriate maintenance timing prediction. In addition, the accuracy of the maintenance timing prediction can be increased by accumulating and updating these pieces of data as teacher data used in machine learning. Furthermore, if the data (image) actually measured is deficient compared to the previously accumulated data (image), it can also be grasped that there is an anomaly in the valve.

[Output of Inference Information by System]

Figure 8:
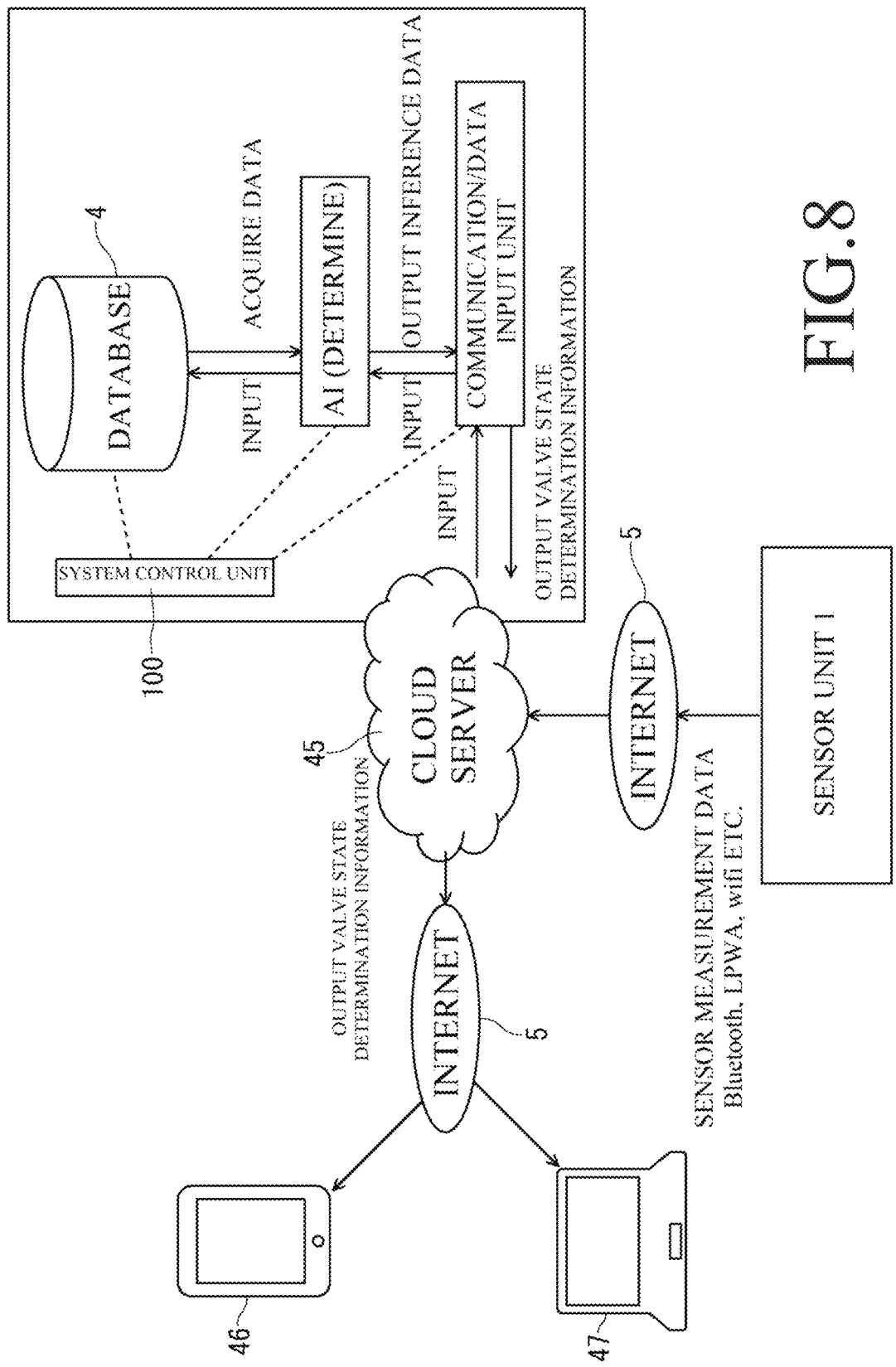
FIG. 8 is a block diagram depicting an example of the entire configuration of the valve state grasping system of the present invention.

Next, data processing in the system of the present embodiment will be described with reference to FIGS. 8 to 10. FIG. 8 depicts a part of the system depicted in FIG. 1 including the server 45 that executes AI determination described further below.

The valve V used in FIG. 8 is the above-described ball valve depicted in FIG. 1, and the sensor unit 1 is also the above-described sensor unit depicted in FIG. 1. Also, the sensor unit 1 is, as an independent single unit provided with the power supply 15, detachably fixed in such a manner as to be rotatable together with the valve stem and connected to the server 45 and the like via the Internet 5 using the communication module 14 wirelessly communicably by using a predetermined wireless communication protocol.

In FIG. 8, the tablet 46 and the PC 47 are examples of the display device 2 for checking information about the valve V-transmitted from the sensor unit 1 and each provided with the display unit 3 capable of displaying data transmitted from the sensor unit 1. For example, any display application that can be acquired from an application server included in the server 45 is used for the display unit 3.

For example, a cloud sever is used as the server 45, and the use of the cloud server is suitable for various computation processes and security measures described further below. In the server 45, all or some pieces of position information such as unique information and pipe attachment information, history information such as measurement information, diagnosis information, and a feature value in the database 4, and, in addition, inference information such as diagnosis inference information and history inference information inferred from the position information and the history information are accumulated (stored) through the system control unit 100, and rewrite of each piece of information or output of the inference information is performed as necessary. A predetermined application server for terminal display or the like may he provided in addition to the server 45. Also in this case, a user having a terminal can access the server at any time and from any location to view the valve state.

A feature value of measurement data for use in grasping the valve state in information inside the server 45 may he the time required for the valve V to reach a predetermined opening degree from a fully-closed state (for example, a time $T_1$ from 0 degree to 10 degrees or a time $T_2$ from 0 degree to 30 degrees), a fully closing time required for the valve V from a fully-open state to a fully-closed state, or the time required for the valve V to reach a fully-closed state from a predetermined opening degree (for example, a time $T_3$ from 80 degrees to 90 degrees), which appears in the angular velocity graph (FIGS. 12 to 16, FIGS. 22 to 24, and FIGS. 25 to 27) obtained from angular velocity data in the axial direction of the valve stem (Y-axis direction).

Also, the feature value may be the number, position, magnitude, and/or width of steep gradients of the angular velocity included in a predetermined time region (for example, the time region $T_1$ or $T_3$), may be the time until the angular velocity reaches a maximum value or a local maximum value or the magnitude or width of the maximum value or the local maximum value, or includes all or some of these. Furthermore, the feature value may be a start/end time of a predetermined time (such as the time $T_1$) and, in the case of leakage amount, may be the presence or absence of leakage (binary value). Feature data as numerical data (scalars, vectors) is generated in accordance with the type of these feature values.

Furthermore, the obtained measurement data may be processed (subjected to so-called pre-processing) to obtain data such as the average angular velocity or the maximum angular velocity in a predetermined opening degree range, and the obtained data may be used as the feature value.

Here, for example, as appearing in FIGS. 12 to 16, FIGS. 22-24, and FIGS. 25 to 27, the steep gradient refers to a portion of each angular velocity graph where the valve opening degree abruptly changes, and one or some plurality of steep gradients appear at uneven positions lopsided with respect to the time axis between a fully-open state and a fully-closed state. A gradient (rate of change) to be read as the steep gradient can be set as appropriate in accordance with implementation. For example, a gradient of a unimodal locus in the region $T_1$ in FIGS. 12 to 16 and FIGS. 22 to 24 and a gradient near the region $T_2$ in FIGS. 12 to 16 can both be read as the steep gradient.

Also, the number of steep gradients is, for example, the number of times a steep gradient appearing on the graph can be read. The position of a steep gradient may be, for example, the time when the steep gradient starts or ends or the middle of these times, or the time corresponding to the local maximum value in the case of a unimodal locus. Also, the displacement of a steep gradient is, for example, the difference between values (opening degrees or angular velocities) corresponding to the start and end times of the steep gradient and may be set to the peak height of an appropriate local maximum value in the case of a unimodal locus. Similarly, the width of a steep gradient is, for example, the difference between the start and end times of the steep gradient and may be set to a width corresponding to the peak height of an appropriate local maximum value in the case of a unimodal locus.

In this manner, when an easy-to-recognize feature appears in the pattern of data that can be acquired in response to one opening and closing operation of the valve in this manner, it is possible to reduce or optimize the size of the amount of information required for processing in statistical operations on data described further below. In particular, since angular velocity graphs obtained by gyroscopes can be easily characterized, teacher data (test data) is easily generated as will be described further below, In the case of sensors other than gyroscopes, a feature is less likely to appear in the pattern of data that can be acquired in response to valve opening and closing. Thus, when this information with less features is used in machine learning, it is necessary to perform additional statistical processing to extract features and use most or all pieces of the acquired data. On the other hand, a characteristic steep gradient is likely to appear on the angular velocity graph data used in the present invention. Thus, statistical operation can be performed with high accuracy only with this small amount of information about steep gradients (a set of several numerical values such as the position, number, displacement, and/or width), which leads to saving of computational resources.

Feature data obtained from such angular velocity graph information is used as part of measurement information of the history information unit 102 through the system control unit 100 in FIGS. 1 and 3, and history information including the measurement information and position information of the position information unit 101 are associated with each other and accumulated in the database 4 (first step). Then, the inference information unit 103 outputs predetermined inference information based on the position information and the history information (second step).

The inference information in the inference information unit 103 includes at least diagnosis inference information and history inference information as described above, and these pieces of inference information are output through the above-described system control unit 100. Hereinbelow, an operation to execute each function will be described. However, the present invention is not limited the described operation, and appropriate processing is performed in accordance with implementation.

For example, as feature data of the history information, two-dimensional angular velocity graph image data itself obtained from angular velocity information (or image data subjected to predetermined data processing so as to be suitable as input data for machine learning) can be used as part of the measurement data. In particular, as described below, it is effective to apply the data to machine learning (deep learning) means related to image recognition, which has made remarkable progress in recent years. In particular, in this case, a GPL1 is preferably used, physically.

Figure 9:
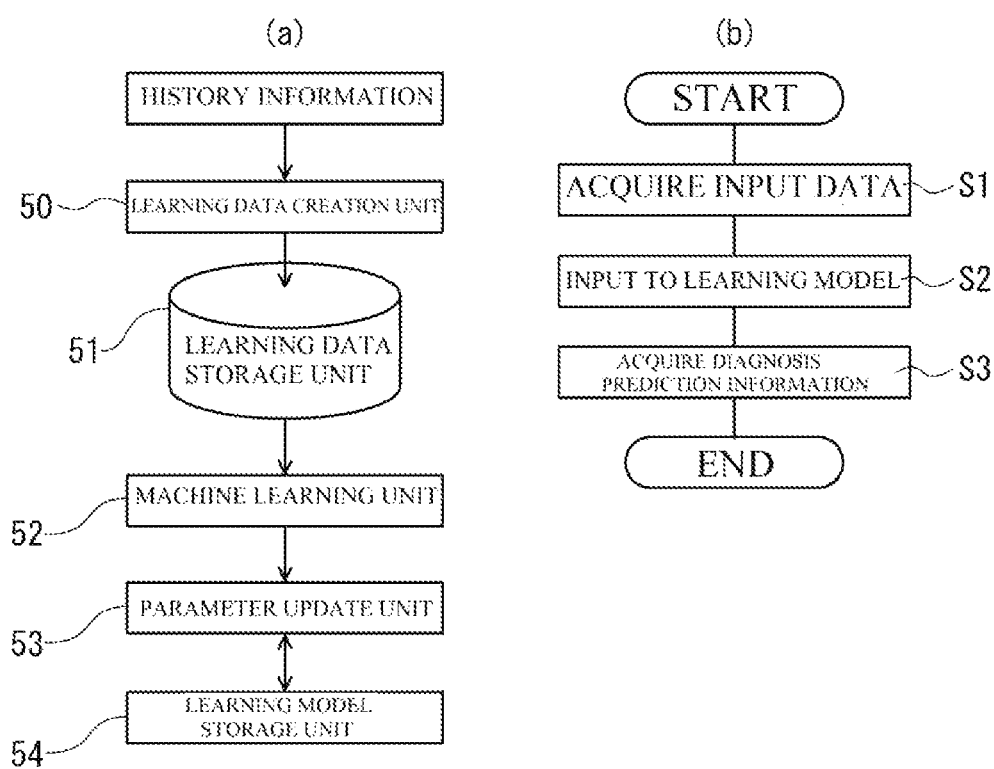
FIG. 9($a$) is a block diagram of an inference system according to the present invention, and FIG. 9($b$) is a flowchart depicting the operation of the inference system.
Figure 10:
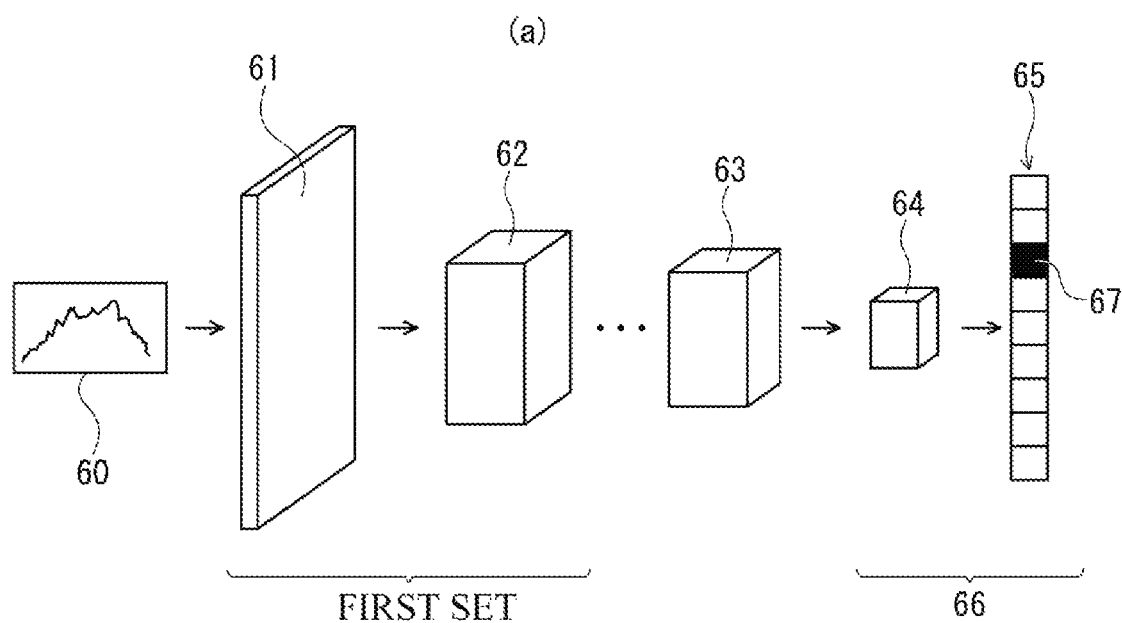
FIG. 10($a$) is a schematic diagram schematically depicting the configuration of a machine learning unit using a CNN, and FIG. 10($b$) is a flowchart depicting an outline of the operation of the machine learning unit using the CNN.
Figure 10:
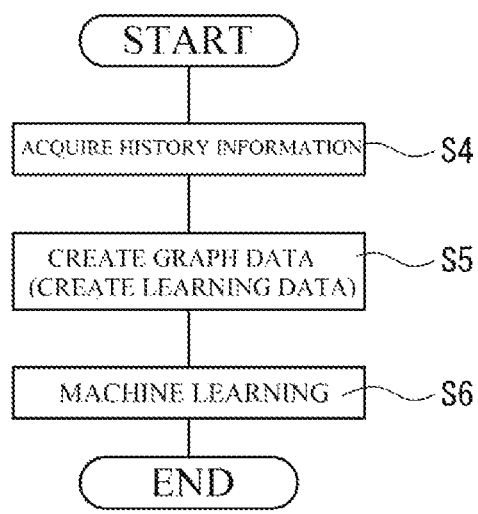

When an inference system of FIG. 9 is in operation, the system control unit 100 has a function of generating a predetermined feature value from predetermined measurement information measured from the valve with the sensor unit 1 attached.

thereto using the history information unit 102 in the same position information and also has a function of assigning, as a learning label, diagnosis information of the valve corresponding to when this measurement information is obtained to this feature value to generate learning data. The system control unit 100 is capable of outputting diagnosis inference information as diagnosis information inferred by the inference information unit 103 through a machine learning technique using this learning data.

FIG. 9(a) is a block diagram depicting the configuration of the inference system by the system control unit 100. The system control unit 100 physically includes one or more computers each including a CPU (GPU) and a memory (both not depicted). The inference system operated in the system control unit 100 including these components includes a learning data creation unit 50, a learning data. storage unit 51, a machine learning unit 52, a parameter update unit 53, and a learning model storage unit 54. The learning data storage unit 51 and the learning model storage unit 54 are memories. The learning data creation unit 50, the machine learning unit 52, and the parameter update unit 53 are function blocks implemented by the CPU (GPU) of the computer executing and interpreting a learning program described further below. The system control unit 100 is capable of controlling information inside the position information unit 101, the history information unit 102, and the inference information unit 103 of the database 4 through the respective functions executed by the learning data creation unit 50, the learning data storage unit 51, the machine learning unit 52, the parameter update unit 53, and the learning model storage unit 54.

The learning data creation unit 50 acquires history information (FIG. 3) from the history information unit 102 of the database 4, associates, as a learning label, diagnosis information (objective variable) with a feature value (explanatory variable) included in the history information, including predetermined pre-processing as learning data (for example, data maintenance, normalization, standardization, expansion, or division), to create learning data, and stores the learning data in the learning data. storage unit 51.

The machine learning unit 52 acquires learning data from the learning data storage unit 51, generates a learning model that can output diagnosis inference information, which is the diagnosis information of the inference information unit 103, and stores the learning model in the learning model storage unit 54 using a prescribed machine learning (deep learning) technique. The timing of storing the learning model in the learning model storage unit 54 and the timing of updating the stored learning model are set as appropriate. Note that the machine learning means a process of optimizing a predetermined parameter of a learning model. The parameter update unit 53 has a function of updating (tuning) parameters under the control of the system control unit 100 as will be described further below.

The system control unit 100 also has, in addition to the above-described inference function executed by the inference system, a function of generating or updating a learning model in which all or some of the elements constituting the position information stored in the database 4 are used as explanatory variables and all or some pieces of the diagnosis information of the history information associated with the position information (for example, only diagnosis information during anomalies) are used as objective variables.

Although a block diagram in this case is not depicted, referring to FIG. 9(a), history information of the history information unit 102 is replaced with position information (or feature position information subjected to predetermined data processing so as to be suitable as input data for machine learning) of the position information unit 101, the learning data creation unit 50 acquires history information associated with the (feature) position information from the database 4 and creates learning data by associating all or some pieces of the diagnosis information included in this history information with each other as a learning label set, and the learning data is stored in the learning data storage unit 51. Furthermore, the machine learning unit 52 generates a learning mode that can output history inference information, which is the inference information of the inference information unit 103, and the learning model is stored in the learning model storage unit 54.

FIG. 9(b) is a flowchart executed when the inference system is operated in the system control unit 100. As will be described further below, the flowchart also includes an operation in evaluating a learned learning model stored in the database 4.

At the operation of the inference system by the system control unit 100, step S1 is a step of acquiring data to be input to a learned learning model that has completed learning (training). As the input data, actual data may be input to the learning model to output inference information or verification data may he input to evaluate the learning model. In the case of the verification data, data with diagnosis information (ground truth label) previously assigned to the feature value is used. The input data is maintained in advance in a data format that can be input to the learning model.

Step S2 is a step of inputting the acquired input data to a learning model retrieved from the learning model storage unit 54. Step S3 is a step of acquiring an output value output from the learning model, and the acquired output is diagnosis inference information or history inference information of the inference information unit 103 as described above.

When the verification data is input, a predetermined accuracy index (learning model achievement) is evaluated by comparing the obtained output value with a pre-labeled ground truth value by using a statistical technique appropriate for the learning model. In accordance with the evaluation, the parameter update unit 53 tunes a predetermined parameter. Alternatively, another learning model may be generated again to change the learning model.

[Machine Learning Technique]

As a technique of the machine learning performed by the machine learning unit 52 described above, various known machine learning algorithms can be applied or used with improvement. For example, machine learning means for obtaining the above-described diagnosis inference information can be set as single-label means (a multi-class classification task in which one class =one diagnosis result) in which diagnosis information as a ground truth label is assigned to a feature value (specifically, two-dimensional angular velocity graph image data) as learning data for each same position information.

FIG. 10(a) depicts an example of machine learning for obtaining output of diagnosis inference information and, specifically, a schematic view of the machine learning unit 52 using a convolutional neural network (CNN, hereinbelow, merely referred to as "CNN"). FIG. 10(b) is a flowchart of a process performed by the CNN. The machine learning unit 52 is configured to process an input image 60, a convolutional layer 61, pooling layers 62 to 64, a last layer 65, and a node 67.

The input image 60 is two-dimensional angular velocity graph information converted from angular velocity information obtained from the opening and closing operation of the valve with the sensor unit 1 attached thereto in a state where one or more symptoms (diagnosis results of diagnosis information) are present. Specifically, the input image 60 is image data similar to the graph images depicted in FIGS. 12 to 16, FIGS. 22 to 24, and FIGS. 25 to 27. The input image 60 may be image data subjected to necessary pre-processing so as to be suitable as input information to the CNN.

The convolutional layer 61 performs a convolution operation on the input image 60 using a filter having an appropriate size to extract a plurality of primary feature maps. The pooling layer 62 connected to the post-stage of the convolutional layer 61 performs pooling (for example, max pooling) on each of plurality of the primary- feature maps output from the convolutional layer 61. This operation creates, from the primary feature maps, as many secondary feature maps as the primary feature maps, each secondary feature map having a smaller amount of information than that of the primary feature map.

A convolutional layer (not depicted) of the second set is connected the post-stage of the pooling layer 62, and a pooling layer of the second set is connected to the post-stage of this convolutional layer. In the layers of the second set, a third-order feature map and a fourth-order feature map are output through a convolutional operation and pooling, respectively. In this manner, the CNN is a multilayer neural network with sets of convolutional and pooling layers alternately connected.

In the pooling layer 64 of the last stage (the n-th set), a 2n-th-order feature map is created from a 2n-1-th-order feature map output from the convolution layer 63. The pooling layer 64 of the last stage, the last layer 65, and the node 67 constitute an output layer 66. One or more fully connected layers in which all nodes are connected to each other are provided near the output layer 66. In the case of N-class classification, the last layer 65 including as many nodes (N nodes) as the classes is provided.

The last layer 65 of FIG. 10(a) schematically indicates an output state in the case of ground truth for the input image 60. The node 67 depicted in this drawing indicates a state where 1 is output (probability: 100%) only from the node corresponding to the valve diagnosis result obtained when the input image 60 is measured, and 0 is output (probability: 0%) from the other nodes, but may indicate probability distribution display with discrete values from 0 to 100%. In this case, probability display like the display of the anomaly display area 42 in FIG. 7 described above can also be made.

In the CNN machine learning, a process that minimizes a classification error for each sample is performed on learning data (labeled sample set). For the minimization of the classification error, for example, parameters including the filter coefficients of each convolutional layer and each pooling layer, the bias of each node, and the weight and bias of the fully connected layer are adjusted so as to minimize the cross-entropy using an actual output of the last layer 65 and an ideal output (ground truth). This a.djustmen.t process is most typically performed using stochastic gradient descent (including error back propagation).

As described above, the display device 2 of FIG. 4 displays, in a state corresponding to the learning data, history information with diagnosis information as a label assigned to the feature value for which angular velocity graph information is input.

In FIG. 10(a), the output of the last layer 65 is output as the probability of an activation function (for example, a softmax function or sigmoid function). Thus, the display device 2 can also display the probability corresponding to a diagnosis result as depicted in FIG. 7. Furthermore, there is also known a technique that enables output of the determination basis for the diagnosis result ("Cause diagnosis basis" described above with reference to FIG. 7 is a display example that displays explanation of the determination basis). As a principle in this case, a process of appropriately extracting and representing a feature value that contributes to the output of the network, and converting a result thereof into human-understandable display is performed. For example, layer-wise relevance propagation (LRP) is known as an example of a technique that extracts an input with a high degree of contribution through back-propagation from the output side to the input side. Making the determination basis explainable will become increasingly important as accountability especially when machine learning determinations are accompanied by human actions.

FIG. 10(b) is a flowchart depicting an example of the operation of the CNN machine learning. In this drawing, step S4 is a step of acquiring history information including angular velocity information (feature value) with diagnosis information as a label assigned thereto. Step S5 is a step, including predetermined pre-processing, of creating input data as two-dimensional angular velocity graph information to be input information to the CNN from the acquired angular velocity information.

In step S6, the machine learning unit 52 inputs input image data to the CNN and performs a machine learning operation to obtain output for each piece of position information and then calculates an error (cross-entropy) of the output value for a value of a learning label (databased diagnosis information) corresponding to the input image 60, By repeating steps S4 to S6, the machine learning unit 52 calculates the total sum of errors for all pieces of history information (learning data) and calculates each parameter of the CNN so that the total sum approaches zero (stochastic gradient descent). The parameter update unit 53 updates each parameter of the learning model stored in the learning model storage unit 54 to the value calculated by the machine learning unit 52. In this manner, a learned learning model is created, and the flowchart is completed, On the other hand, as a machine learning technique that outputs history inference information of the inference information unit 103, although not depicted, for example, a known multi-label machine learning technique can be used or applied.

For example, machine learning is performed using, as feature values, all pieces of position information of the position information unit 101 stored in the database 4 and using, as multiple labels for learning, all or some pieces of the diagnosis information included in history information of the history information unit 102 associated one-to-one with the feature values. In this case, all pieces of diagnosis information used as the labels need to be standardized into the same data format. For example, the all pieces of diagnosis information need to be the same number of pieces of diagnosis information acquired at the same timing (elapsed time). The diagnosis information may be assigned, as multiple labels, to the position information associated with the diagnosis information to create learning data, and training may be performed on this learning data using a multi-label CNN to create a learning model or update the learning model.

Furthermore, in the above-described CNN, by providing a plurality of units corresponding to a plurality of labels in the output layer 66, multi-label classification tasks can also be applied to the CNN machine learning. According to such a learning model, history information in the form of time-series data with predetermined intervals (inferred multiple labels) can be output to the inference information unit 103 as future history inference information of the valve including position information as input information.

[Diversion]

As described above, at least diagnosis inference information of the inference information unit 103 can be obtained by machine learning using the same position information as one domain in the position information unit 101. In this case, since the position information of the position information unit 101 includes unique information and pipe attachment information, valves that differ in any one or more of the unique information and the pipe attachment information also differ in the position information. Thus, the position information stored in the database 4 cannot be used as it is for such a valve with different position information, which makes it difficult to obtain inference information for this valve.

Even in such a case, when the position information unit 101 acquires new position information for which unique information and/or pipe attachment information does not exist in the database 4, the system control unit 100 can divert position information of the position information unit 101 existing in the database 4 based on the new position information to output inference information of the inference information unit 103 using a learning model in the existing position information. That is, also for position information with no history information (for example, a valve manufactured by another company), the valve state and the timing of maintenance can be predicted using history information of the history information unit 102 in other position information and history information of another valve accumulated in the database.

Specifically, as an example of the case where unique information in the position information unit 101 does not exist, a case where a valve manufactured by another company is used will be described. For a valve manufactured by another company, detailed operating characteristics are unknown. Thus, in the case of a valve having equivalent nominal pressure, nominal diameter, material, and valve type, for example, a Class 150 floating type ball valve made of SUS304 and having a nominal diameter of 100 A, the state and maintenance timing of the valve manufactured by another company are predicted by referring to unique information of "150UTB100", which is the valve manufactured by the applicant of the present application, accumulated in the database 4 and using history information of the history information unit 102 associated with position information using this unique information.

Here, since the valve manufactured by another company and the valve manufactured by the applicant naturally differ in operating characteristics, as the valve is continuously opened and closed, the inferred state of the valve and the actual state of the valve become different from each other. Thus, in the history information unit 102, new history information is added to the position information of the position information unit 101 relating to this valve, and a learning model is generated including this new history information to enable prediction with increased accuracy.

Next, when no pipe attachment information in position information of the position information unit 101 exists for a target plant, by referring to position information for another plant accumulated in the database 4, position information having similar unique information and pipe attachment information is diverted to data of the target plant. Accordingly, inference information can be output using a learning model in this position information.

These cases are desirably achieved by learning means called transfer learning in which position information stored as one domain inside the position information unit 101 is transferred as another piece of position information as a learning model. In transfer learning, a learned learning model obtained from a sufficiently good (large amount of) learning data is modified, when a different type of objective data from a domain to which this learning model belongs is obtained, so as to adapt to this objective data. By using transfer learning, it may also be possible to adapt an existing learning model to a valve having new position information by using as few feature values (input image data) as possible measured from this valve. While various known techniques can be used as transfer learning, the following technique is desirably used in the present invention.

Figure 11:
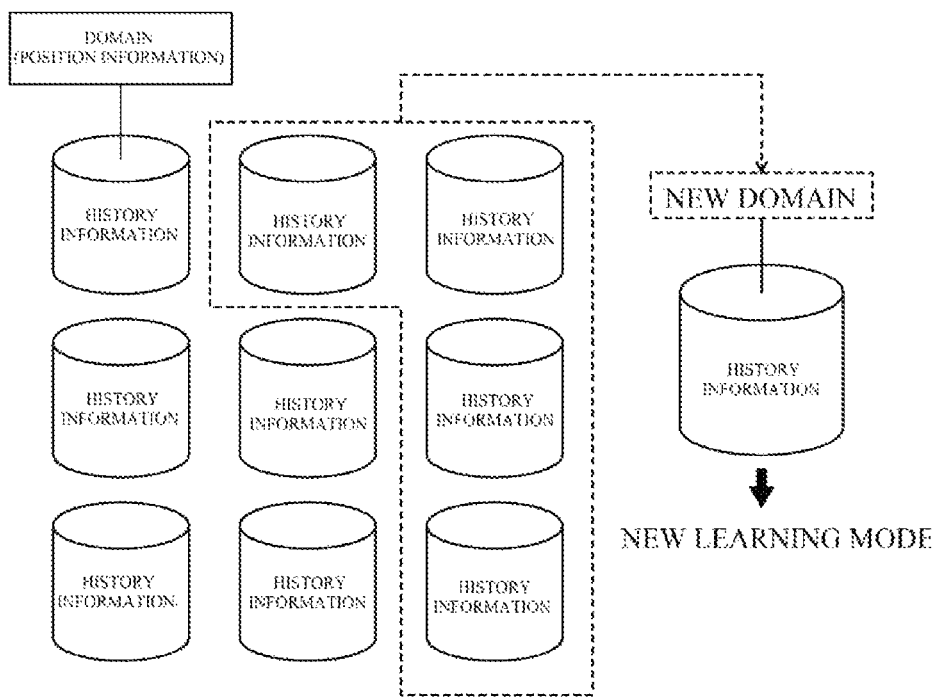
FIG. 11($a$) is a schematic diagram of a database depicting an example of a position information diverting technique for generating a new domain from an existing domain stored in the database, and FIG. 11($h$) is an explanatory diagram depicting another example of the data structure of the present invention.
Figure 11:
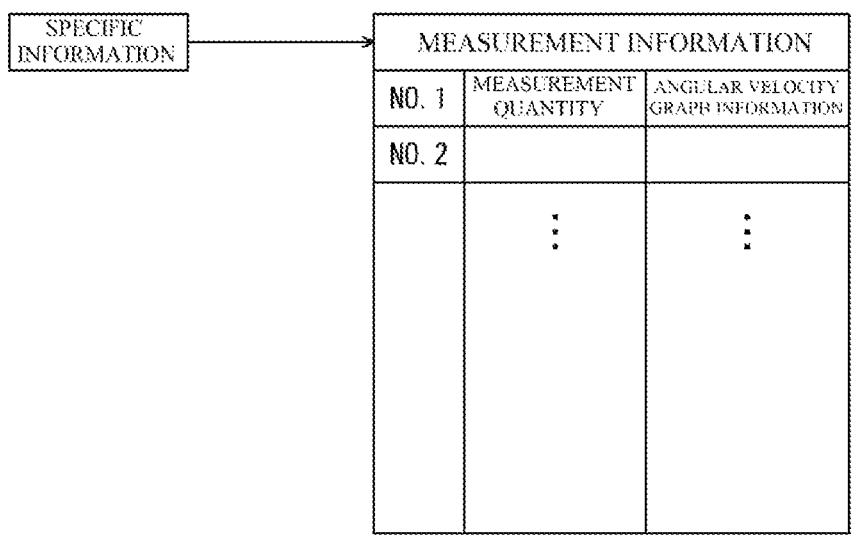
Figure 12:
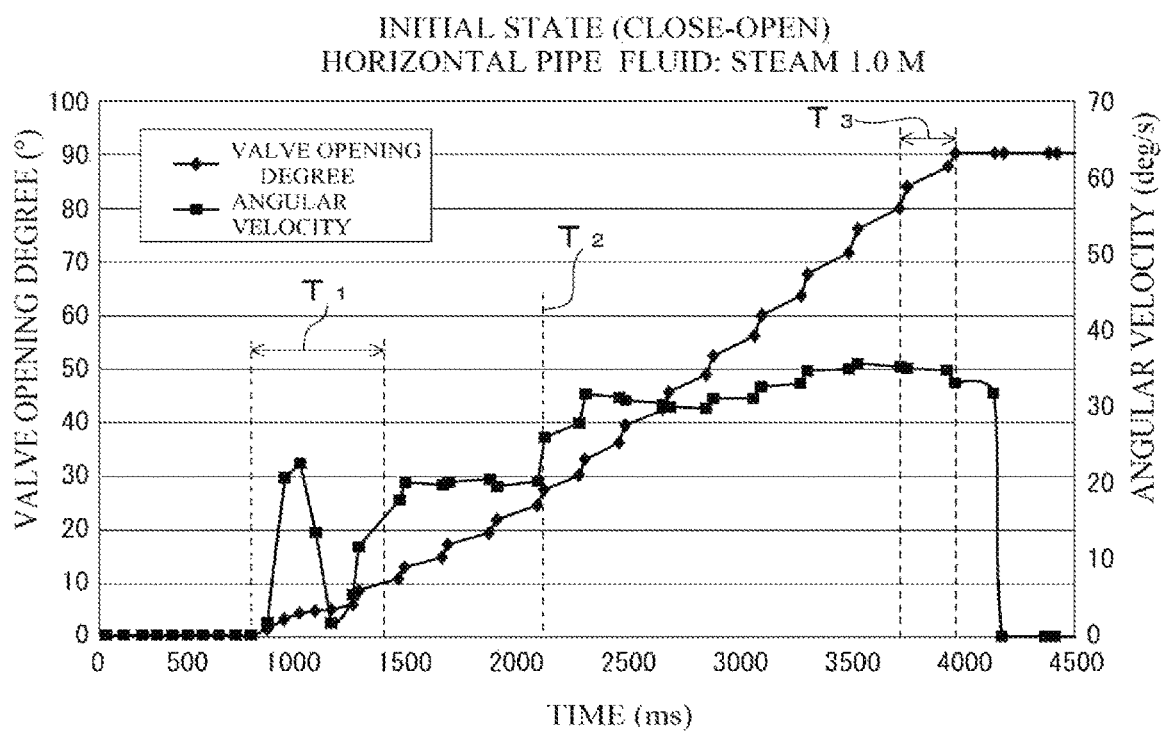
FIG. 12 is an example of an angular velocity graph obtained in the ball valve under specific conditions.
Figure 13:
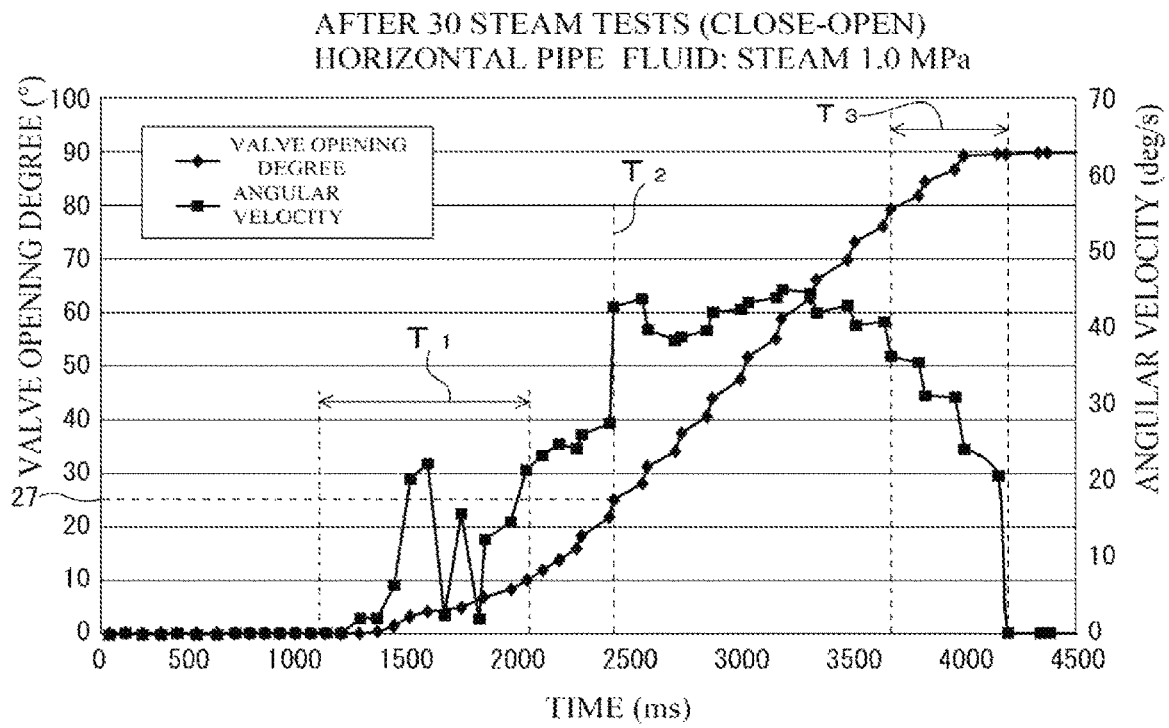
FIG. 13 is all example of the angular velocity graph obtained in the ball valve under specific conditions.
Figure 14:
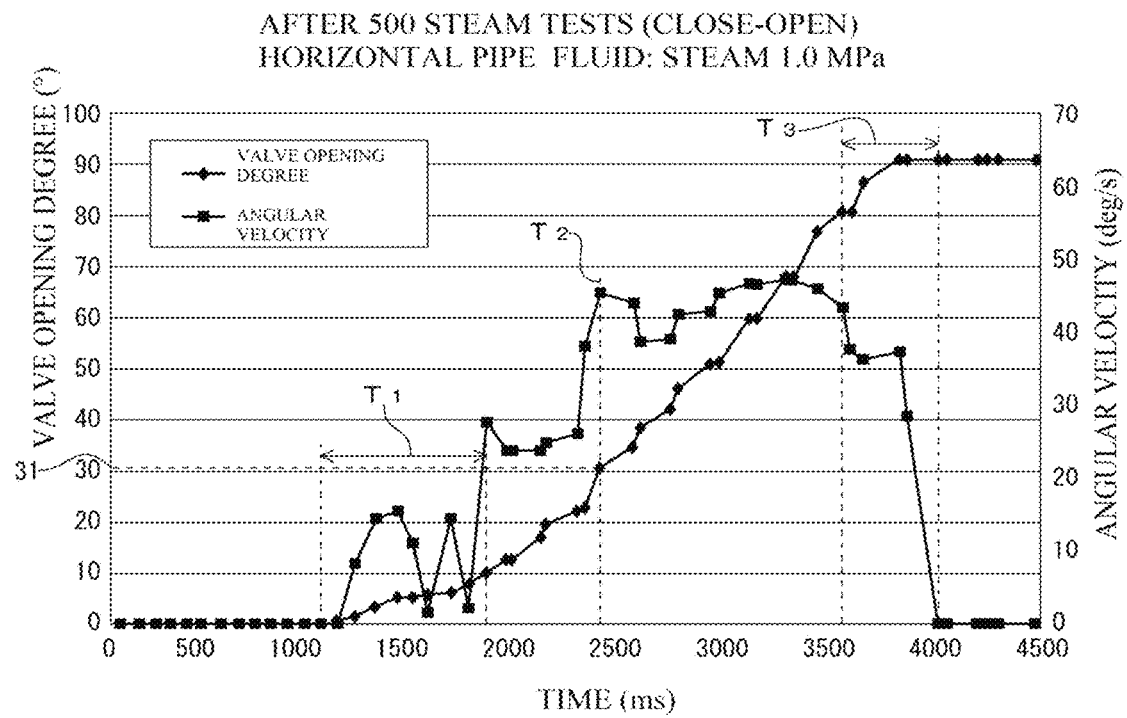
FIG. 14 is an example of the angular velocity graph obtained in the ball valve under specific conditions.
Figure 15:
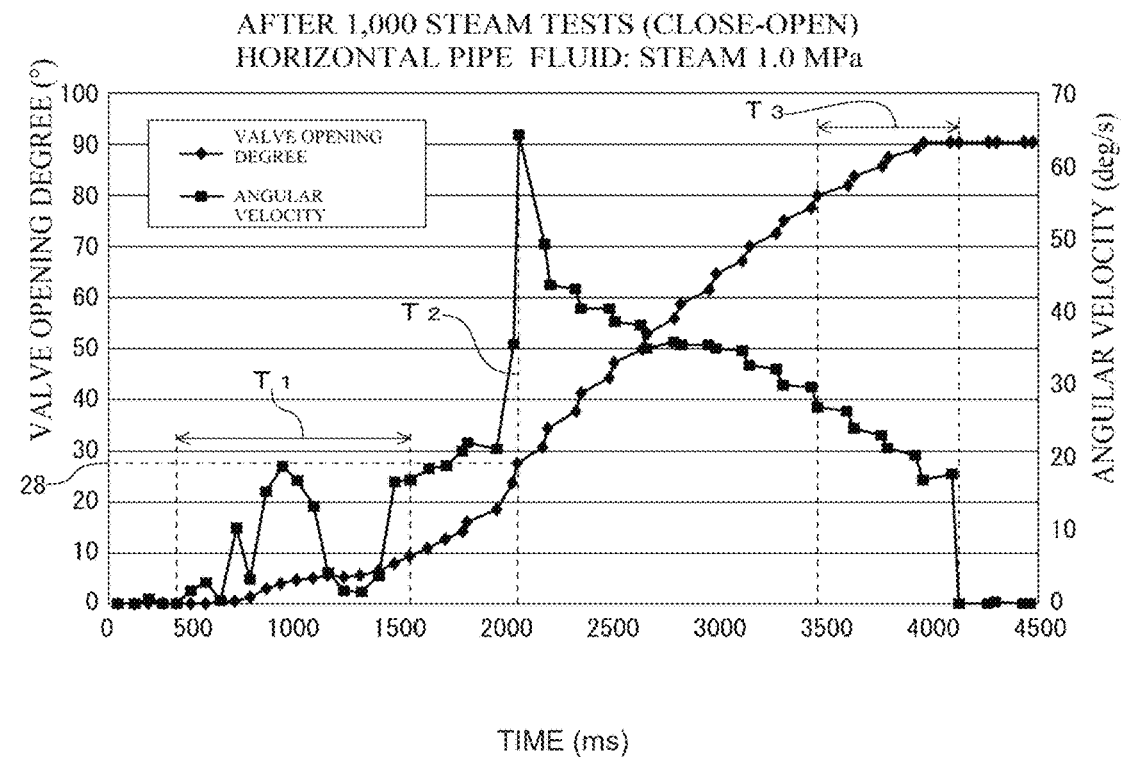
FIG. 15 is an example of the angular velocity graph obtained in the ball valve under specific conditions.
Figure 16:
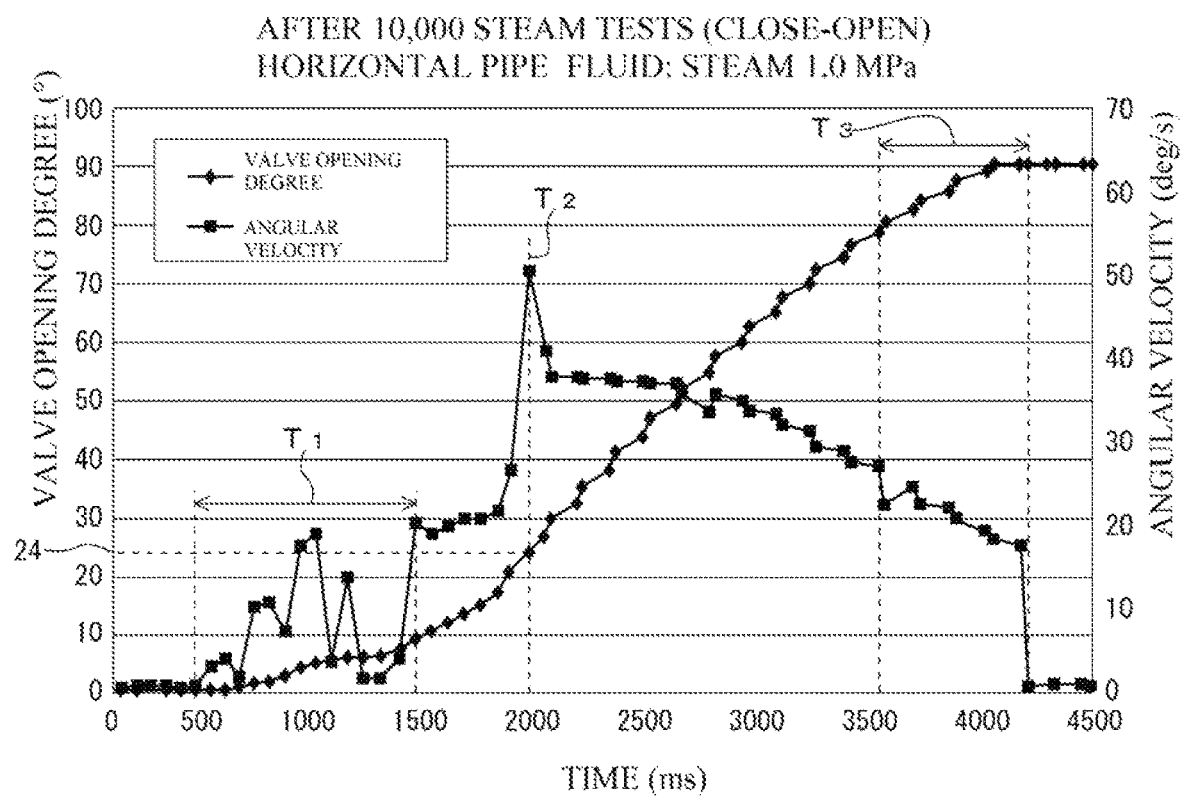
FIG. 16 is all example of the angular velocity graph obtained in the ball valve under specific conditions.

In the case of the present invention, position information can be effectively used as index information for generating a new domain (diversion of position information) as follows. As depicted in FIG. 11(a), associations of learned learning models are established on a position information basis. Thus, the position information is regarded as one domain of the learning models. When a valve (hereinbelow, referred to as "new valve") having position information that does not exist in the database 4 (hereinbelow, referred to as "new position information") is dealt with, a new domain (refer to FIG. 11(a)) is first generated based on the new position information.

The new domain forms, relative to the existing domain, a history information set having a size (information amount) that is the same as or larger than that of the existing domain. Elements of the new domain at this time include part of the unique information (hereinbelow, referred to as "new unique information") and part of the pipe attachment information (hereinbelow, referred to as "new pipe attachment information"), the new unique information and the new pipe attachment information constituting new position information. In this case, for example, in the unique information/the pipe attachment information, the order of the most prioritized element (for example, valve type for unique information and pipe diameter for pipe attachment information) is determined in advance. All pieces of existing position information having commonality with the new position information only in the elements with high priority (one or more sets) are acquired from the database 4, and the other elements are ignored.

Specifically, for example, when the element with priority in the unique information is only valve type, and the element with propriety in the pipe attachment information is only pipe diameter, the new position information in the position information unit 101 includes only valve type and pipe diameter, and all pieces of position information within the same range as the new position information (the same range is appropriately determined in advance for each element) are obtained from the database 4. As an example, when only valve type is used in commonality determination and the new valve is a ball valve, all pieces of position information of ball valves existing in the database 4 are acquired. In this manner, for the new position information, which element is to be used in commonality determination can be set as appropriate. However, limiting the new position information too much increases the possibility that position information having commonality with that of the new valve does not exist in the database 4. Thus, it is necessary to set the new position information to an appropriate size.

In FIG. 11(a), the new position information acquired in this manner is used as the new domain, and a new learning model is generated using all pieces of history information of the history information unit 102 associated with the new domain. A method for generating or updating the learning model based on the history information associated with the new domain is similar to the above. The new learning model can also be held in the database 4 in advance as position information or history information even when a new valve is not dealt with. For example, the valve type of unique information may be limited only to ball valves or a small number of elements, and new position information corresponding to the new domain may be set in advance. From history information associated with this new position information, for example, a ball valve general learning model may be held in the database 4 in advance at each appropriate timing.

The new learning model obtained in this manner belongs to the new domain, and history information of the new domain is learning data obtained from the valve with characteristics having some degree of commonality with the new valve as described above. Thus, not only the number of training data samples, but also a certain degree of quality as learning data can be ensured. While the new learning model may be used as it is for the new valve, this new learning model may be further trained using a feature value (input image) obtained from the new valve as learning data, for example, through a known transfer learning technique.

As an outline of the known transfer learning technique, in the case of CNN, it is common to tune parameters by freezing and unfreezing for some of the nodes in the network. It is known that, in this case, by applying a process of relearning only to a part of the network, even a modification to an existing learning model can exhibit high reliability for input data belonging to a new domain. Note that it is needless to say that transfer learning for the new learning model may be omitted.

In the diversion of position information as described above, as a simpler method, for example, history information in position information for one position is used for a valve installed in another position. This applies to, for example, a case where a new valve is provided on a common pipe line. In this case, position information about the piping position of the new valve and the valve to be disposed on the pipe can be easily diverted corresponding to the common pipe line as new position information.

In this case, in the case of the same pipe line, there is similarity in use conditions and external environment in many cases, and there is a high possibility that the position information can be effectively used as the new position information. Thus, the position information of the existing valve disposed on this pipe line can be used. At this time, to generate a new domain, domains having common pipe attachment information with the pipe line on which the new valve is to be provided are acquired, a domain having common unique information (for example, valve type) with the new valve is selected as appropriate from these domains and easily set as the new domain, and history information of the new domain can be used for the new valve.

Furthermore, diversion may be performed across different pipe lines. As a diversion technique at this time, for example, when, of the pipe lines A and B, the use of the A line is first started and the use of the B line is next started in FIG. 1, position information corresponding to the piping conditions of the valve V1 can be diverted to position information corresponding to the piping conditions of the valve V3. Specifically, the use of the A line is started, and history information of the history information unit 102. is accumulated in association with the position information of the position information unit 101 corresponding to the valve V1. Then, when the use of the B line is started, the history information associated with the position information corresponding to the valve V1 may be diverted as information used to infer the state of the valve V3 and detect anomalies (or predict the timing of maintenance or replacement). This is because of the following reason. The valve V1 and the valve V3 in this drawing are connected to the same device. In addition, on the lines A and B connected to this device, the valve V1 and the valve V3 are both the first valves from the device and similar in use conditions (it is more preferred that the distance LA1 and the distance LB1 be closer). Thus, the above-described history information can be determined to be an effective diversion candidate.

If no diversion is performed, it is necessary, after the valve V3 is started, to newly accumulate history information in association with its position information.

Thus, it takes a considerable amount of time to use the accumulated information. In particular, a sufficient amount of data is required to predict information such as the maintenance timing with high accuracy. On the other hand, by performing the diversion described above, there is a high possibility that highly accurate inference and prediction can be performed with a small amount of data processing within a short period of time while using the existing accumulated information in the database 4.

Furthermore, for example, in FIG. I, when the valve V4 is a product manufactured by another company and there is a lack of unique information for identifying the valve V4 in the database 4, as described above, unique information of a valve manufactured by the own company corresponding to the valve manufactured by the other company is diverted, and standard history information of the own company's valve is used. This makes it possible to quickly infer the timing of maintenance or replacement of the valve V4 as accurately as possible.

Note that as a technique of machine learning by the machine learning unit 52, in applying a machine algorithm, an appropriate machine learning algorithm may be selected in accordance with each piece of position information, specifically, unique information and pipe attachment information. As means for the selection, a filtering function may be used. For example. "a machine learning algorithm for pipe attachment close to a pump" may be selected. Furthermore, a machine algorithm to be applied may be changed for each separate range of the valve opening/closing angle such as "from a fully-closed state to 20% or less in opening degree" or "more than 20% and 80% or less in opening degree". In addition, a machine learning algorithm actually applied may be preferentially applied to the machine learning unit 52.

[Application of System]

When angular velocity graph information is measured using the gyroscope 8, the measurement may be performed limiting the feature values of FIG. 3 to angular velocity graph information, and the diagnosis information may be read as a predetermined measurement quantity corresponding to this angular velocity graph information for application to the system. That is, while, in the above example, the case where diagnosis information is used as a label for history information as learning data to generate a learning model has been described, the label is not limited to the diagnosis information and may be a valve measurement quantity measured by the sensor unit 1. Also, in this case, the associations based on position information of the position information unit 101 may be replaced with associations based on predetermined specific information for identifying the valve with the sensor unit 1 attached thereto.

FIG. 11(b) depicts a data structure with such replacement. The measurement quantity in this case means, other than angular velocity graph information, information that can be measured by the sensor unit 1 from the valve V when the sensor unit 1 measures the angular velocity graph information from the valve V. For example, the measurement value is the opening/closing count, opening/closing time, or torque of the valve, which can be measured from the opening and closing operation of the valve.

The specific information is various types of information required to identity a valve in a use state such as the valve type, product manufacturer's name, operating conditions (such as the installation environment including temperature and fluid in use), or the type of a wear component, and may be, for example, all or some pieces of the position information of the position information unit 101 described above. in this case, referring to FIG. 3, position information can be read as specific information, history information can be read as measurement information, a feature value can be read as angular velocity graph information, and diagnosis information can be read as a measurement quantity measured when the angular velocity graph information is obtained.

in this case, referring to the drawings, the system of the present invention includes: the sensor unit 1 including the rotary valve V provided on the pipe line A, B, and the gyroscope 8 fixed to the rotary valve V and capable of acquiring angular velocity graph information (input image 60) corresponding to the opening and closing operation of the rotary valve V and a predetermined measurement quantity corresponding to the angular velocity graph information; the server 45 capable of communicating with the sensor unit 1 and including the database 4; the display device 2 capable of communicating with the server 45 and the sensor unit 1 and including the display unit 3; and the system control unit 100. The system control unit 100 is a valve learning model generating system configured to accumulate, in the database 4, learning data with the measurement quantity assigned as a learning label to the angular velocity graph information for each specific condition for identifying the valve V and create or update a learning model through machine learning (CNN) using the learning data.

In this case, output of an inferred measurement quantity can be obtained by inputting new angular velocity graph information (input image 60) to the learning model. Also, the valve learning model generating system may be a system that automatically acquires data. from the sensor unit 1 attached to the valve V in actual operation and accumulates the acquired data in the database 4 under automatic control of the system control unit 100, creates training data from the accumulated data, and generates and updates a learning model through machine learning (CNN).

Furthermore, the above-described diagnosis information is not limited to information about the symptom (diagnosis result) of the valve, but may be an actual measurement value of, for example, damage of a predetermined part actually measured. from the valve, such as a. dimensional wear amount of the valve seat (ball seat) corresponding to when the angular velocity graph information is obtained. However, in this case, it is necessary to acquire the actual measurement quantity by actually measuring it from the valve every time angular velocity graph information is obtained.

[About Others]

Furthermore, as described above with reference to the example of FIG. 7, the system according to the present invention can issue a warning about an anomalous state of the valve V in a predetermined form on the display unit 3 of the display device 2 based on diagnosis inference information of the inference information unit 103 under the control of the system control unit 100. A plant provided with a pipe line is typically provided with a DCS (central control system or the like) in advance. Thus, the system of the present invention may be communicably connected to another control system provided in advance in the plant or the like to also enable transmission of warning information issued by the system of the present invention to this existing control system. In this manner, the system of the present invention can also cooperate with another existing system.

Furthermore, the present invention can be implemented not only as a system, but also a program for causing a computer (computer system) to execute the system.

Also, the present invention can be implemented as a non-transitory computer readable recording medium, such as a CD-ROM, recording the program.

For example, when the present invention is implemented as a program (software), each step including the above-described steps is executed by executing the program using hardware resources such as a CPU, a memory, and an input/output circuit of a computer. Each step is executed by the CPU acquiring data from the memory, the input/output circuit, or the like and performing a computation on the data, or outputting a result of the computation to the memory, the input/output circuit or the like.

In particular, each constituent element included in the display device 2 and the sensor unit 1 of the above-described embodiment may be implemented as a dedicated or general-purpose circuit or may be implemented as a large scale integration (LSI), which is an integrated circuit (IC). The integrated circuit is not limited to the LSI, and may be a dedicated circuit or a general-purpose processor. A field programmable gate array (FPGA) or a reconfigurable processor with reconfigurable circuit cell connections and settings inside the LSI may be used. Furthermore, if a circuit integration technology that replaces LSIs emerges due to advances in semiconductor technology or other derived technologies, this circuit integration technology may be used to perform circuit integration on each constituent element included in the display device 2 and the sensor unit 1.

While the embodiment of the present invention has been described above in detail, the present invention is not limited to the description of the above embodiment and can be variously modified without departing from the scope of the invention defined in the claims of the present invention.

REFERENCE SIGNS LIST 1 sensor unit
2 display device (terminal device)
3 display unit (touch panel)
4 database
5 network (Internet)
8 gyroscope
18 control shaft (valve stem)
45 cloud server (server)
46 tablet (terminal device)
47 PC (terminal device)
52 machine learning unit
60 input image (feature value)
100 system control unit
101 position information unit
102 history information unit
103 inference information unit
A, B pipe line
V1, V2, V3, V4 ball valve (rotary valve)

The invention claimed is:

1. A valve state grasping system comprising at least:
a valve provided on a pipe line;
a sensor detachably attached to the valve;
a display device;
a server wirelessly coupled with the sensor, wherein the server comprises a database, a memory having a program stored thereon, and a processor;
wherein the database includes a position information of the valve, a history information, and an inference information;
wherein the inference information includes diagnosis inference information inferred from the position information and history inference information inferred from the history information;
wherein the position information includes at least unique information for identifying the valve and pipe attachment information specific to a position on the pipe where the valve is provided;
wherein the history information includes at least predetermined measurement information and diagnosis information of the valve corresponding to the measurement information; and
wherein the program, when executed by the processor, causes the server to:
instruct the sensor to obtain the predetermined measurement information that measures an opening and closing operation of the valve;
update the history information in the database based on work to the valve being required using information corresponding to the work;
accumulate, in the database, the position information and the history information in association with each other; and
output, to the display device, predetermined inference information based on the position information, the history information, or both.

2. The valve state grasping system according to claim 1, wherein the program when further executed by the processor causes the server to, when acquiring new position information different from the unique information and/or the pipe attachment information of the position information, output inference information by diverting position information based on the new position information.

3. The valve state grasping system according to claim 1, wherein the program when further executed by the processor causes the server to generate a predetermined feature value from the measurement information in the history information, create learning data with a feature value of the history information associated with a learning label corresponding to diagnosis information of the history information for the valve in the same position information, and create or update a learning model that infers diagnosis information of the history information and outputs diagnosis inference information through machine learning using the learning data.

4. The valve state grasping system according to claim 1, wherein the program when further executed by the processor causes the server to create learning data with position information associated with a learning label corresponding to history information, and create or update a history model that outputs history inference information obtained by inferring history information of the history information through machine learning using the learning data.

5. The valve state grasping system according to claim 1, wherein the valve is a quarter-turn rotary valve that rotates around a valve stem, the sensor includes a gyroscope built therein and is fixed to the valve stem rotatably together with the valve stem, the program when further executed by the processor causes the server to acquire angular velocity graph information representing, in graph form, angular velocity information of the valve stem as measurement information of the history information, a feature value of the history information is a predetermined feature value generated from the angular velocity graph information, and diagnosis information of the history information is diagnosis information of the valve corresponding to the feature value.

6. The valve state grasping system according to claim 1, wherein the pipe attachment information of the position information includes a distance from the valve to an element that is disposed on a primary side and/or a secondary side and closest to the valve.

7. The valve state grasping system according to claim 1, wherein the program when further executed by the processor causes the server to display angular velocity graph information of the valve obtained by the gyroscope on the display device.

8. The valve state grasping system according to claim 1, wherein the program when further executed by the processor causes the server to display, based on a predetermined predicted value obtained by applying predetermined state prediction to measurement information of the history information obtained by the gyroscope, a graph having a vertical axis representing measurement information of the history information and a horizontal axis as a time axis from the present to the future on the display device.

9. The valve state grasping system according to claim 1, wherein the display device is a portable display device that wirelessly communicates with the server and the sensor.

10. The valve state grasping system according to claim 9 further comprising a quarter-turn rotary valve comprising the portable display device.

11. A valve state grasping program that is the program for causing the server to execute the valve state grasping system according to claim 1.

12. A non-transitory recording medium of memory storing the valve state grasping program according to claim 11.

13. A valve state grasping method of a server of a valve state grasping system comprising a valve, a sensor, and a display device, the valve state grasping method comprising:
storing in a database of the server a position information of the valve, a history information and an inference information, wherein the inference information includes diagnosis inference information inferred from the position information and history inference information inferred from the history information, wherein the position information includes at least unique information for identifying the valve and pipe attachment information specific to a position on the pipe where the valve is provided, and wherein the history information includes at least predetermined measurement information and diagnosis information of the valve corresponding to the measurement information;
instructing a sensor to obtain a predetermined measurement information that measures an opening and closing operation of the valve, wherein the valve is provided on a pipe line and the sensor is detachably attached to the valve;
updating the history information in the database based on work to the valve being required using information corresponding to the work;
accumulating, in the database, the position information of the history information in associated with each other; and outputting, to the display device, inference information based on the position information and the history information, or both.

14. The valve state grasping method according to claim 13, further comprising:
generating a predetermined feature value from measurement information in the history information;
creating learning data with a feature value of the history information associated with a learning label corresponding to diagnosis information of the history information for the valve in the same position information; and
creating or updating a learning model that infers diagnosis information of the history information and outputs diagnosis inference information of the inference information through machine learning using the learning data.

* * * * *